US006772125B2

(12) United States Patent
Harradine et al.

(10) Patent No.: US 6,772,125 B2
(45) Date of Patent: Aug. 3, 2004

(54) AUDIO/VIDEO REPRODUCING APPARATUS AND METHOD

(75) Inventors: Vincent Carl Harradine, Burlington (CA); Alan Turner, Basingstoke (GB); Morgan William David, Farnham (GB); Michael Williams, Basingstoke (GB); Mark John McGrath, Bracknell (GB); Andrew Kydd, Basingstoke (GB); Jonathan Thorpe, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 10/005,603

(22) Filed: Dec. 4, 2001

(65) Prior Publication Data

US 2002/0152082 A1 Oct. 17, 2002

Related U.S. Application Data

(63) Continuation of application No. PCT/GB01/01452, filed on Mar. 30, 2001.

(30) Foreign Application Priority Data

| Apr. 5, 2000 | (GB) | 0008429 |
| Apr. 5, 2000 | (GB) | 0008432 |
| Apr. 5, 2000 | (GB) | 0008434 |

(51) Int. Cl.[7] .............................................. G10L 15/26
(52) U.S. Cl. ...................... 704/278; 704/235; 382/236; 386/46
(58) Field of Search ................................ 704/235, 251, 704/257, 275, 278; 382/236; 386/46, 55, 66, 69

(56) References Cited

U.S. PATENT DOCUMENTS 4,734,764 A  3/1988  Pocock et al.

(List continued on next page.)

FOREIGN PATENT DOCUMENTS

EP        0 526 064      2/1993

(List continued on next page.)

OTHER PUBLICATIONS

SMPTE Journal, *Proposed Smpte Standard for Television—Unique Material Identifier (UMID)*, Mar. 2000, pp 221–225.
Wilkinson J H et al.: "Tools And Techniques For Globally Unique Content Identification" Smpte Journal, Smpte Inc. Scardale, N.Y, US, vol. 109, No. 10, Oct. 2000, pp. 795–799, XP 000969315.

*Primary Examiner*—Daniel Abebe
(74) *Attorney, Agent, or Firm*—Frommer Lawrence & Haug LLP; William S. Frommer

(57) ABSTRACT

An audio/video reproducing apparatus is connectable to a communications network for selectively reproducing items of audio/video material from a recording medium in response to a request received via the communications network. The audio/video reproducing apparatus may comprise a control processor operable in use to receive data representing the request for the audio/video material item via the communications network. A reproducing processor is operable in response to signals identifying the audio/video material items from the control processor to reproduce the audio/video material items. The data identifying the audio/video material items includes meta data indicative of the audio/video material items. The meta data may be one of UMID, tape ID and time codes, and a Unique Material Identifier the material items. To facilitate the identification and selection of the audio and/or video material, an audio and/or video processing apparatus is provided for processing audio and/or video signals representing sound and/or images. The processing apparatus comprises an activity detector operable to generate an activity signal indicative of an amount of activity within the sound/images represented by the audio/video signal, and a meta data generator coupled to the activity detector which is operable to generate sample images at temporal positions within the audio/video signal, which temporal positions are determined from the activity signal. The processing apparatus thereby provides a facility for automatically generating meta data from received audio/video signals. The meta data can be used to select the audio/video material.

49 Claims, 13 Drawing Sheets

U.S. PATENT DOCUMENTS

| | | | | |
|---|---|---|---|---|
| 4,926,415 | A | * 5/1990 | Tawara et al. | 370/231 |
| 5,414,523 | A | * 5/1995 | Azuma et al. | 386/104 |
| 5,664,227 | A | * 9/1997 | Mauldin et al. | 707/516 |
| 5,675,738 | A | 10/1997 | Suzuki et al. | |
| 5,771,330 | A | 6/1998 | Takano et al. | |
| 5,790,174 | A | 8/1998 | Richard, III et al. | |
| 5,805,733 | A | 9/1998 | Wang et al. | |
| 5,818,511 | A | 10/1998 | Farry et al. | |
| 5,835,667 | A | * 11/1998 | Wactlar et al. | 386/96 |
| 5,892,535 | A | * 4/1999 | Allen et al. | 725/36 |
| 5,910,825 | A | 6/1999 | Takeuchi | |
| 5,933,603 | A | 8/1999 | Vahalia et al. | |
| 6,038,368 | A | 3/2000 | Boetje et al. | |
| 6,085,019 | A | * 7/2000 | Ito et al. | 386/52 |
| 6,269,394 | B1 | * 7/2001 | Kenner et al. | 709/217 |
| 6,360,234 | B2 | * 3/2002 | Jain et al. | 707/500.1 |
| 6,463,444 | B1 | * 10/2002 | Jain et al. | 707/104.1 |

FOREIGN PATENT DOCUMENTS

| | | |
|---|---|---|
| EP | 0 613 080 | 8/1994 |
| EP | 0 613 145 | 8/1994 |
| EP | 0 764 951 | 3/1997 |
| EP | 0 902 431 | 3/1999 |
| EP | 0 915 622 | 5/1999 |
| EP | 1 083 567 | 3/2001 |
| EP | 1 083 568 | 3/2001 |
| EP | 1 102 271 | 5/2001 |
| GB | 2 312 078 | 10/1997 |
| GB | 2 329 812 | 3/1999 |
| GB | 2 326 025 | 10/1999 |
| GB | 2 341 969 | 3/2000 |
| WO | WO 97 39411 | 10/1997 |
| WO | WO 99 36918 | 7/1999 |

* cited by examiner

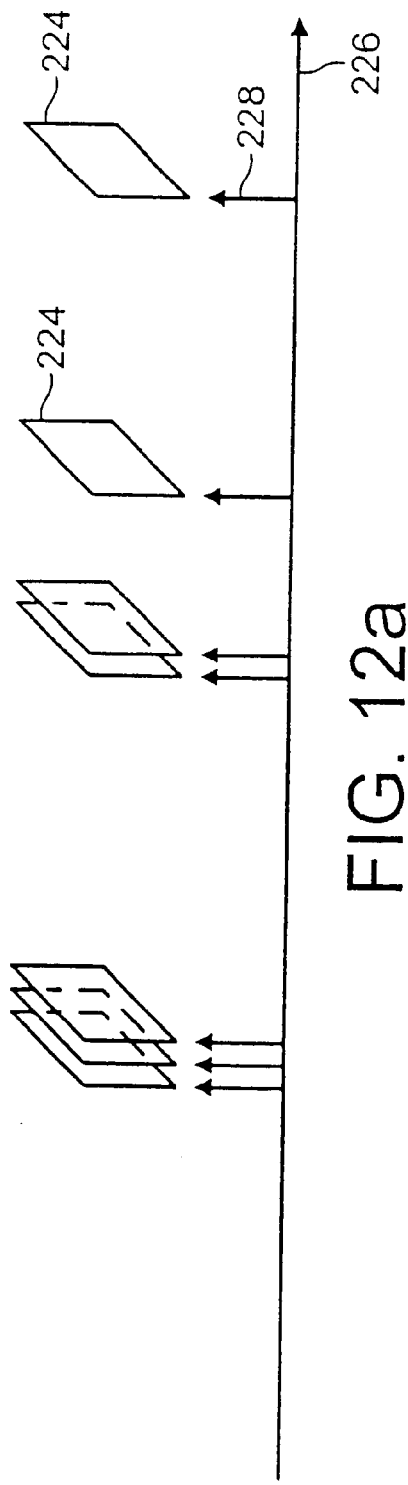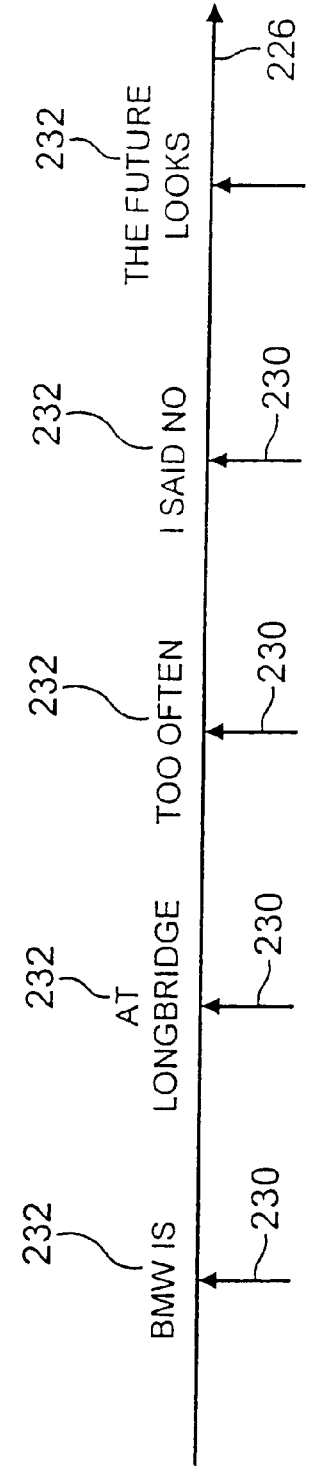

AUDIO/VIDEO REPRODUCING APPARATUS AND METHOD

This is a continuation of copending International Application PCT/GB01/01452 having an international filing date of Mar. 30, 2001.

FIELD OF THE INVENTION

The present invention relates to audio/video reproducing apparatus and methods of reproducing audio/video material.

The present invention also relates to video processing apparatus, audio processing apparatus and methods of processing video signals and audio signals.

The present invention also relates to editing systems for combining items of audio/video material to form audio/video productions. The present invention also relates to methods of generating audio/video productions.

BACKGROUND OF THE INVENTION

Editing is a process in which items of audio/video material are combined to form an audio/video production. Generally audio/video material items are captured from a source in accordance with a predetermined plan. However, typically many audio/video material items are not used in the edited version of the audio/video production. For example, a television program, such as a high quality drama, may be formed from a combination of takes of audio/video material items from a single camera. As such, in order to form the program, several takes are combined in order to form a flow required by the story of the drama. Furthermore several takes may be generated for each scene but only a selected number of these takes are combined in order to form the scene.

The term audio and/or video will be referred to herein as audio/video and includes any form of information representing sound or visual images or a combination of sound and visual images.

In a post production process the items of audio/video material are selectively combined by the editor to form the audio/video production. However in order to select the required audio/video material items to form the production, the editor must review the items of audio/video material that have been generated. This is a time consuming and arduous task, particularly when a linear recording medium, such as a video tape has been used to record the audio/video material items.

In general the quality of the images represented on the recording medium, to the extent that the images and/or sound represent the original source is arranged to be as high as possible. This means that an amount of information that must be store to represent these images and/or sound is relatively high. As a result, the images and/or sound cannot be readily accessed so that the content of the audio/video material items cannot be easily ascertained once recorded. This is particularly so, if a format in which the images and sounds are represented is compressed in some way. For example video cameras and camcorders are arranged conventionally to record a video signals representing the moving images on a video tape. Once the video signals have been recorded on to the video tape, a user cannot determine the content of the video tape without reviewing the entire tape. Furthermore, because video tape is an example of a linear recording medium, the task of navigating through the media to locate particular content items of video material is time consuming and labour intensive. As a result during an editing process in which selected items from the contents of the video tape are combined in an order which may be different to that in which they were recorded, it may be necessary to review the entire contents of the video tape in order to identify the selected items.

SUMMARY OF INVENTION

According to the present invention there is provided an audio/video reproducing apparatus connectable to a communications network for selectively reproducing items of audio/video material from a recording medium in response to a request received via said communications network.

By providing an audio/video reproducing apparatus which is connectable to a communications network, an editing facility is provided for reproducing audio/video material items, in which the items may be remotely selected. A network connection provides a facility for the audio/video material items to be accessed separately by more than one editing terminal.

The content of video material generated by a camera is typically stored in a form which facilitates a high quality reproduction. In general the quality of the images represented by the video signal, to the extent that the images reflect an original image source falling within the field of view of the camera, is arranged to be as high as possible. This means that an amount of information that must be store to represent these images is relatively high. This in turn requires that the video signal is stored in a format that does not readily allow access to the content of the video signals. This is particularly so, if the video signal is compressed in some way. For example, video cameras and camcorders are arranged conventionally to record a video signals representing moving images on to a video tape. Once the video signals have been recorded on to the video tape, a user cannot readily determine the content of the video tape without reviewing the entire tape. Alternatively, the contents of the recording medium may be ingested to provide substantially non-linear access to the audio/video material. However this is time consuming, particularly for example for a linear recording medium. Therefore by providing a facility for accessing the audio/video material items via a network, the items may be selectively accessed via the network, without being ingested and without having to review the entire of the tape.

In preferred embodiments the audio/video reproducing apparatus may comprise a control processor which is arranged in use to receive data representing requests for audio/video material items via the communications network, and a reproducing processor coupled to the control processor and arranged in response to signals identifying the audio/video material items from the control processor to reproduce the audio/video material items, which are communicated via the communications network.

The task of navigating through the media to locate particular content items of video material is time consuming and labour intensive. As a result during an editing process in which selected items from the contents of the video tape are combined in an order which may be different to that in which they were recorded, it may be necessary to review the entire contents of the video tape in order to identify the selected items. Hence by identifying the audio/video material items required and reproducing only the items identified, an advantage is provided in respect of the time taken to edit an audio/video production.

In order to receive commands identifying the audio/video material items and to communicate the audio/video material items, the audio/video reproducing apparatus may comprise a first network interface connectable to a first communications network for receiving the data representing the requests for audio/video material, and a second network interface connectable to a second communications network for communicating the items of audio/video material. By providing a first network interface adapted to receive data representative of request for audio/video data and a second interface for communicating the items of audio/video material, the first and second interfaces can be optimised for the different type of data being communicated. For the audio/video material items this is particularly important because the network connection must stream audio/video which requires a relatively high bandwidth. As such in preferred embodiments, the first network interface may be arranged to operate in accordance with a data communications network standard such as Ethernet, RS 322 or RS 422 or the like. Furthermore, the second network interface may be arranged to operates in accordance with the Serial Digital Interface (SDI) or the Serial Digital Transport Interface (SDTI).

A particular advantage is provided by identifying the content of the audio/video material items so that appropriate items may be selected and ingested via the network. Meta data is data which serves to describe either the content of audio/video material or parameters present or used to generate the audio/video material or any other information associated with the audio/video material.

In preferred embodiments, the data representing requests for audio/video material items includes meta data indicative of the audio/video material items. The meta data may be at least one of UMID, tape ID and time codes, and a Unique Material Reference Number.

Although the reproducing apparatus may be arranged to reproduce items of audio/video material from a single recording medium, the reproducing processor may comprise a plurality of audio/video recording/reproducing apparatus each of which is coupled to said control processor via a local data bus. A further improvement is provided to the audio/video reproducing apparatus in accessing a plurality of recording media from the control process so that, for example the entire contents of a shoot from which the audio/video production is to be generated can be accessed via the network. Access may also be arranged in parallel. The recording media may also be different, so that some of the plurality of audio/video recording/reproducing apparatus may reproduce the audio/video items from tape and some from disc.

In order to access the audio/video material present on the recording media, in preferred embodiments, the local bus may include a control communications channel for communicating control data to and/or from the control processor, and a video data communications channel for communicating the items of audio/video material from the plurality of audio/video recording/reproducing apparatus to the communications network.

To provide an indication of the contents of the audio/video material, the audio/video reproducing apparatus may have a display device which is arranged in operation to display images representative of the audio/video material items present on the recording medium. Furthermore to facilitate access to the audio/video material items, the display device may be a touch screen coupled to the control processor, and arrange in use to receive touch commands from a user for selecting the items of audio/video material.

According to another aspect of the present invention there is provided a video processing apparatus for processing video signals representing images comprising an activity detector which is arranged in operation to receive the video signals and to generate an activity signal indicative of an amount of activity within the images represented by the video signal, and a meta data generator coupled to the activity detector which is arranged in operation to receive the video signal and the activity signal and to generate meta data representing the content of the video signals at temporal positions within the video signal, which temporal positions are determined from the activity signal.

In preferred embodiments the meta data generator is an image generator, the meta data generated being sample images at the temporal images within the video signal determined by the activity signal.

The present invention provides a particular advantage in providing an indication of the content of video signals, at temporal positions within those signals at which there is activity. As a result an improvement is provided to an editing or a process in which the video signals are being ingested for further processing, in providing an visual indication from the sample images of the content of the video signals at temporal positions within the video signals which may be of most interest to an editor or user.

The sample images can provide a static representation of the moving video images which facilitates navigation by providing a reference to the content of the moving video images.

The activity signal may be generated from generating a color histogram of the color components within an image and determining activity from a rate of change of the histogram, or from for example motion vectors for selected image components. The activity signal may be therefore representative of a relative amount of activity within the images represented by the video signal and the image detector may be arranged in operation to produce more of the sample images during periods of greater activity indicated by the activity signal. By arranging for more sample images to be generated a greater periods of activity, the information provided to an editor about the content of the video signals is increased, or alternatively the available resources for generating the sample images is concentrated on periods within the video signal of most interest.

In order to reduce an amount of data capacity required to store and/or communicate the sample images, the sample images may be represented by a substantially reduced amount of data in comparison to the images represented by the video signal.

Although the video processing apparatus may receive the video signals from an separate source, advantageously the video processing apparatus may further comprise a reproduction processor which is arranged in operation to receive a recording medium on which the video signals are recorded and to reproduce the video signals from the recording medium. Furthermore in preferred embodiments the image generator may be arranged in operation to generate, for each of the sample images a material identification representative of locations on the recording medium where the video signals corresponding to the sample images are recorded. This provides an advantage in not only providing a visual indication of the contents of a recording medium, but also providing with the visual indication a location at which this content is stored so that the video signals at this location can be reproduced for further editing.

According to another aspect of the present invention there is provided an audio processing apparatus for processing an audio signal representing sound, the apparatus comprising an activity detector which is arranged in operation to receive the audio signal and to generate an activity signal indicative of an amount of activity within the sound represented by the audio signal, and a meta data generator coupled to the activity detector which is arranged in operation to receive the audio signal and the activity signal and to generate meta data representing the content of the audio signals at temporal positions within the audio signal, which temporal positions are determined from the activity signal.

According to a further aspect of the present invention there is provided an audio processing apparatus for processing audio signals representative of sound, the audio processing apparatus comprising a speech analysis processor which is arranged in operation to generate speech data identifying speech detected within the audio signals, an activity processor coupled to the speech analysis processor and arranged in operation to generate an activity signal in response to the speech data, and a content information generator, coupled to the activity processor and the speech analysis processor and arranged in operation to generate data representing the content of the speech at temporal positions within the audio signal determined by the activity signal.

As for video signals, the present invention finds application in generating an indication of the content of speech present in audio signals, whereby navigation through the content of the audio signals is facilitated. For example, in preferred embodiments, the activity signal may indicative of the start of a speech sentence, so that the data representing the content of the speech provides an indication of the content of the start of each sentence.

The content data can provide a static structural indication of the content of the audio signals which can facilitate navigation through the audio signals by providing a reference to the content of those signals.

Although the audio processor may receive the audio signal from a separate source, in preferred embodiments, the reproduction processor may be arranged in operation to receive a recording medium on which the audio signals are recorded and to reproduce the audio signals from the recording medium. Furthermore, the content information generator may be arranged in operation to generate, for each of the content data items a material identification representative of a location on the recording medium where the audio signals corresponding to the content data are recorded. As such, an advantage is provided to an editor by associating a material identifier providing the location of the audio signals on the recording medium corresponding to the content data, with the content data which can be used to navigate through the recording medium. The content data may be any convenient representation of the content of the speech, however, in preferred embodiments the content data is representative of text corresponding to the content of the speech.

According to another aspect of the present invention there is provided a system for editing audio/video productions comprising an ingestion processor having means for receiving a recording medium and is arranged in use to reproduce audio/video material items from the recording medium, a data base operable to receive and to store meta data describing the contents of audio/video material items loaded into the ingestion processor, and an editing processor coupled to the ingestion processor and the data base, the editing processor having a graphical user interface for displaying a representation of the meta data stored in the data base and for selecting the audio/video material items from the displayed representation of the meta data, the editing processor being arranged to combine user selected items of audio/ video material, which are selectively reproduced by the ingestion processor in response to meta data corresponding to the selected items of audio/video material being communicated to the ingestion processor by the editing processor.

As already explained, during acquisition, once the signals representing the audio/video material items have been recorded on to the recording medium, a user cannot readily determine the content of the audio/video material items without reproducing the items from the recording medium. Alternatively, the contents of the recording medium may be ingested to provide substantially non-linear access to the audio/video material. This is time consuming, particularly for example for a linear recording medium. However by providing access to meta data which may be generated at acquisition of the audio/video material, and which describes the content of the material, an editing system may select and only reproduce items of audio/video material from the recording medium which are required for the edited audio/ video production. As such the editing process is made more efficient by only ingesting audio/video material items which are required for the audio/video production.

Advantageously, the editing processor may be coupled to the data base and to the ingestion processor via a data communications network. The communications network provides a facility for accessing the meta data and the audio/video material items remotely. Additionally, more than one editing processor may be coupled to the comminations network thereby providing a facility for the matadata in the data base and the audio/video material to be selectively accessed, whereby editing of more than one audio/ video production may be edited contemporaneously.

In preferred embodiments, the data communications network may comprise a first communications network coupled to the editing station, the data base and the ingestion processor for communicating the meta data, and a second communications network coupled to the editing station, the data base and the ingestion processor for communicating the items of audio/video material. By providing a first communications channel adapted to receive data representative of requests for audio/video data and a second communications channel for communicating the items of audio/video material, the first and second interfaces can be optimised for the different type of data being communicated. For the audio/video material items this is advantageous because the network connection must stream audio/video which requires a relatively high bandwidth. As such in preferred embodiments, the first network interface may be arranged to operate in accordance with a data communications network standard such as Ethernet, RS 322 or RS 422 or the like. Furthermore, the second network interface may be arranged to operates in accordance with the Serial Digital Interface (SDI) or the Serial Digital Transport Interface (SDTI).

In preferred embodiments, the meta data may be one of a UMID, tape ID and time codes, and a Unique Material Reference Number, identifying the material items.

As mentioned above, the meta data may be generated with the audio/video material items during acquisition. As such, the recording medium may include the meta data describing the content of the audio/video material items recorded on to the recording medium, and the ingestion processor may be arranged in operation to reproduce the meta data and to communicate the meta data via the network to the data base, the data base operating to receive and to store the meta data.

A particular advantage is provided by identifying the content of the audio/video material items so that appropriate items may be selected and ingested via the network.

The term meta data as used herein refers to and includes any form of information or data which serves to describe either the content of audio/video material or parameters present or used to generate the audio/video material or any other information associated with the audio/video material. Meta data may be, for example, "semantic meta data" which provides contextual/descriptive information about the actual content of the audio/video material. Examples of semantic meta data are the start of periods of dialogue, changes in a scene, introduction of new faces or face positions within a scene or any other items associated with the source content of the audio/video material. The meta data may also be syntactic meta data which is associated with items of equipment or parameters which were used whilst generating the audio/video material such as, for example, an amount of zoom applied to a camera lens, an aperture and shutter speed setting of the lens, and a time and date when the audio/video material was generated. Although meta data may be recorded with the audio/video material with which it is associated, either on separate parts of a recording medium or on common parts of a recording medium, meta data in the sense used herein is intended for use in navigating and identifying features and essence of the content of the audio/video material, and may, therefore be separated from the audio/video signals when the audio/video signals are reproduced. The meta data is therefore separable from the audio/video signals.

Various further aspects and features of the present invention are defined in the appended claims.

BRIEF DESCRIPTION OF DRAWINGS

Embodiments of the present invention will now be described by way of example with reference to the accompanying drawings wherein:

FIG. 12a is a schematic representation of the generation of picture stamps at sample times of audio/video material, FIG. 12b is a schematic representation of the generation of text samples with respect to time of the audio/video material, FIG. 13 provides as illustrative representation of an example structure for organising meta data.

DESCRIPTION OF PREFERRED EMBODIMENTS

Acquisition Unit

Embodiments of the present invention relate to audio and/or video generation apparatus which may be for example television cameras, video cameras or camcorders. An embodiment of the present invention will now be described with reference to FIG. 1 which provides a schematic block diagram of a video camera which is arranged to communicate to a personal digital assistant (PDA). A PDA is an example of a data processor which may be arranged in operation to generate meta data in accordance with a user's requirements. The term personal digital assistant is known to those acquainted with the technical field of consumer electronics as a portable or hand held personal organiser or data processor which include an alpha numeric key pad and a hand writing interface.

Figure 1:
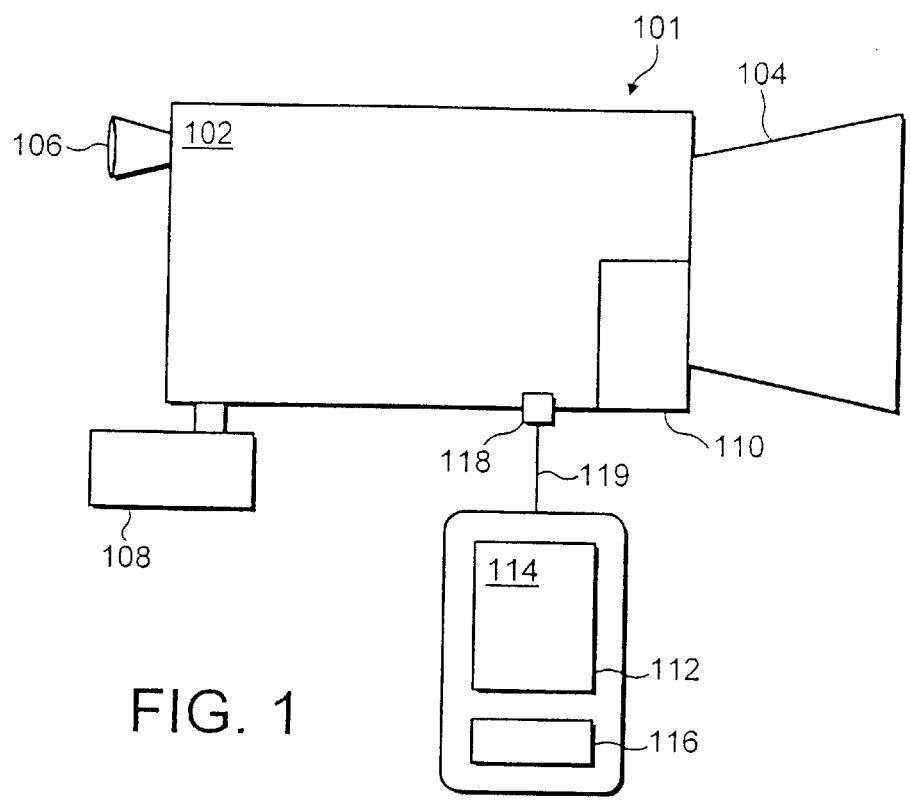
FIG. 1 is a schematic block diagram of a video camera arranged in operative association with a Personal Digital Assistant (PDA)

In FIG. 1 a video camera 101 is shown to comprise a camera body 102 which is arranged to receive light from an image source falling within a field of view of an imaging arrangement 104 which may include one or more imaging lenses (not shown). The camera also includes a view finder 106 and an operating control unit 108 from which a user can control the recording of signals representative of the images formed within the field of view of the camera. The camera 101 also includes a microphone 110 which may be a plurality of microphones arranged to record sound in stereo. Also shown in FIG. 1 is a hand-held PDA 112 which has a screen 114 and an alphanumeric key pad 116 which also includes a portion to allow the user to write characters recognised by the PDA. The PDA 112 is arranged to be connected to the video camera 101 via an interface 118. The interface 118 is arranged in accordance with a predetermined standard format such as, for example an RS232 or the like. The interface 118 may also be effected using infra-red signals, whereby the interface 118 is a wireless communications link. The interface 118 provides a facility for communicating information with the video camera 101. The function and purpose of the PDA 112 will be explained in more detail shortly. However in general the PDA 112 provides a facility for sending and receiving meta data generated using the PDA 112 and which can be recorded with the audio and video signals detected and captured by the video camera 1. A better understanding of the operation of the video camera 101 in combination with the PDA 112 may be gathered from FIG. 2 which shows a more detailed representation of the body 102 of the video camera which is shown in FIG. 1 and in which common parts have the same numerical designations.

Figure 2:
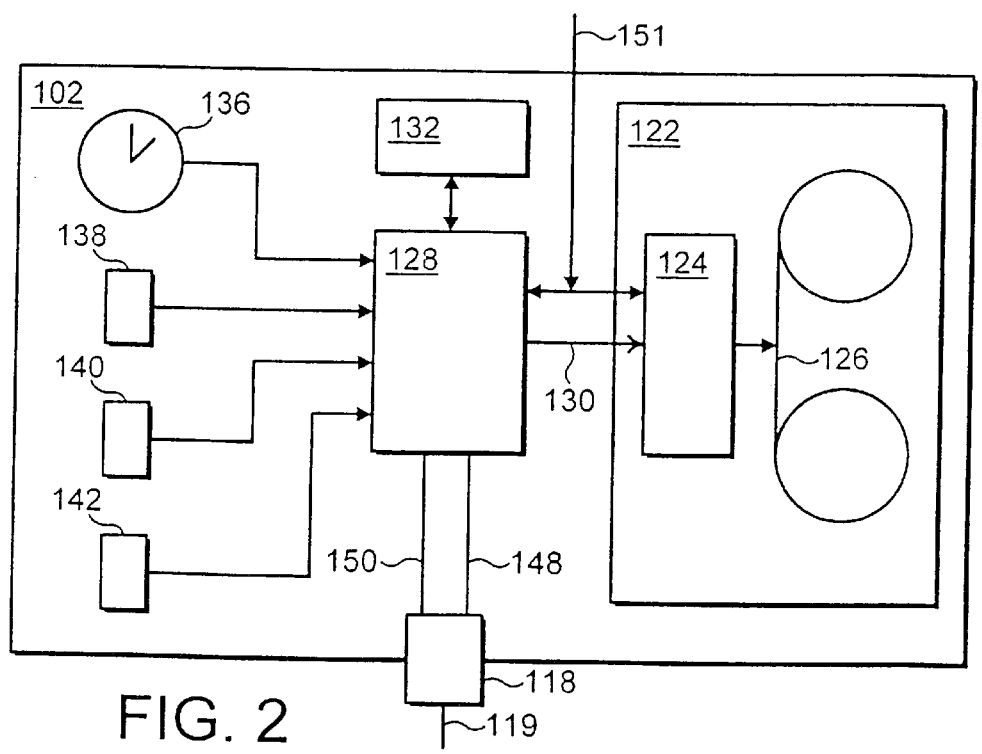
FIG. 2 is a schematic block diagram of parts of the video camera shown in FIG. 1.

In FIG. 2 the camera body 102 is shown to comprise a tape drive 122 having read/write heads 124 operatively associated with a magnetic recording tape 126. Also shown in FIG. 2 the camera body includes a meta data generation processor 128 coupled to the tape drive 122 via a connecting channel 130. Also connected to the meta data generation processor 128 is a data store 132, a clock 136 and three sensors 138, 140, 142. The interface unit 118 sends and receives data also shown in FIG. 2 via a wireless channel 119. Correspondingly two connecting channels for receiving and transmitting data respectively, connect the interface unit 118 to the meta data generation processor 128 via corresponding connecting channels 148 and 150. The meta data generation processor is also shown to receive via a connecting channel 151 the audio/video signals generated by the camera. The audio/video signals are also fed to the tape drive 122 to be recorded on to the tape 126.

The video camera 110 shown in FIG. 1 operates to record visual information falling within the field of view of the lens arrangement 104 onto a recording medium. The visual information is converted by the camera into video signals. In combination, the visual images are recorded as video signals with accompanying sound which is detected by the microphone 101 and arranged to be recorded as audio signals on the recording medium with the video signals. As shown in FIG. 2, the recording medium is a magnetic tape 126 which is arranged to record the audio and video signals onto the recording tape 126 by the read/write heads 124. The arrangement by which the video signals and the audio signals are recorded by the read/write heads 124 onto the magnetic tape 126 is not shown in FIG. 2 and will not be further described as this does not provide any greater illustration of the example embodiment of the present invention. However once a user has captured visual images and recorded these images using the magnetic tape 126 as with the accompanying audio signals, meta data describing the content of the audio/video signals may be input using the PDA 112. As will be explained shortly this meta data can be information that identifies the audio/video signals in association with a pre-planned event, such as a 'take'. As shown in FIG. 2 the interface unit 118 provides a facility whereby the meta data added by the user using the PDA 112 may be received within the camera body 102. Data signals may be received via the wireless channel 119 at the interface unit 118. The interface unit 118 serves to convert these signals into a form in which they can be processed by the acquisition processor 128 which receives these data signals via the connecting channels 148, 150.

Meta data is generated automatically by the meta data generation processor 128 in association with the audio/video signals which are received via the connecting channel 151. In the example embodiment illustrated in FIG. 2, the meta data generation processor 128 operates to generate time codes with reference to the clock 136, and to write these time codes on to the tape 126 in a linear recording track provided for this purpose. The time codes are formed by the meta data generation processor 128 from the clock 136. Furthermore, the meta data generation processor 128 forms other meta data automatically such as a UMID, which identifies uniquely the audio/video signals. The meta data generation processor may operate in combination with the tape driver 124, to write the UMID on to the tape with the audio/video signals.

In an alternative embodiment, the UMID, as well as other meta data may be stored in the data store 132 and communicated separately from the tape 126. In this case, a tape ID is generated by the meta data generation processor 128 and written on to the tape 126, to identify the tape 126 from other tapes.

In order to generate the UMID, and other meta data identifying the contents of the audio/video signals, the meta data generation processor 128 is arranged in operation to receive signals from other sensor 138, 140, 142, as well as the clock 136. The meta data generation processor therefore operates to co-ordinate these signals and provides the meta data generation processor with meta data such as the aperture setting of the camera lens 104, the shutter speed and a signal received via the control unit 108 to indicate that the visual images captured are a "good shot". These signals and data are generated by the sensors 138, 140, 142 and received at the meta data generation processor 128. The meta data generation processor in the example embodiment is arranged to produce syntactic meta data which provides operating parameters which are used by the camera in generating the video signals. Furthermore the meta data generation processor 128 monitors the status of the camcorder 101, and in particular whether audio/video signals are being recorded by the tape drive 124. When RECORD START is detected the IN POINT time code is captured and a UMID is generated in correspondence with the IN POINT time code. Furthermore in some embodiments an extended UMID is generated, in which case the meta data generation processor is arranged to receive spatial co-ordinates which are representative of the location at which the audio/video signals are acquired. The spatial co-ordinates may be generated by a receiver which operates in accordance with the Global Positioning System (GPS). The receiver may be external to the camera, or may be embodied within the camera body 102.

When RECORD START is detected, the OUT POINT time code is captured by the meta data generation processor 128. As explained above, it is possible to generate a "good shot" marker. The "good shot" marker is generated during the recording process, and detected by the meta data generation processor. The "good shot" marker is then either stored on the tape, or within the data store 132, with the corresponding IN POINT and OUT POINT time codes.

As already indicated above, the PDA 112 is used to facilitate identification of the audio/video material generated by the camera. To this end, the PDA is arranged to associate this audio/video material with pre-planned events such as scenes, shots or takes. The camera and PDA shown in FIGS. 1 and 2 form part of an integrated system for planning, acquiring, editing an audio/video production. During a planning phase, the scenes which are required in order to produce an audio/video production are identified. Furthermore for each scene a number of shots are identified which are required in order to establish the scene. Within each shot, a number of takes may be generated and from these takes a selected number may be used to form the shot for the final edit. The planning information in this form is therefore identified at a planning stage. Data representing or identifying each of the planned scenes and shots is therefore loaded into the PDA 112 along with notes which will assist the director when the audio/video material is captured. An example of such data is shown in the table below.

| A/V Production | News story: BMW disposes of Rover |
|---|---|
| Scene ID: 900015689 | Outside Longbridge |
| Shot 5000000199 | Longbridge BMW Sign |
| Shot 5000000200 | Workers Leaving shift |
| Shot 5000000201 | Workers in car park |
| Scene ID: 900015690 | BMW HQ Munich |
| Shot 5000000202 | Press conference |
| Shot 5000000203 | Outside BMW building |
| Scene ID: 900015691 | Interview with minister |
| Shot 5000000204 | Interview |

Figure 3:
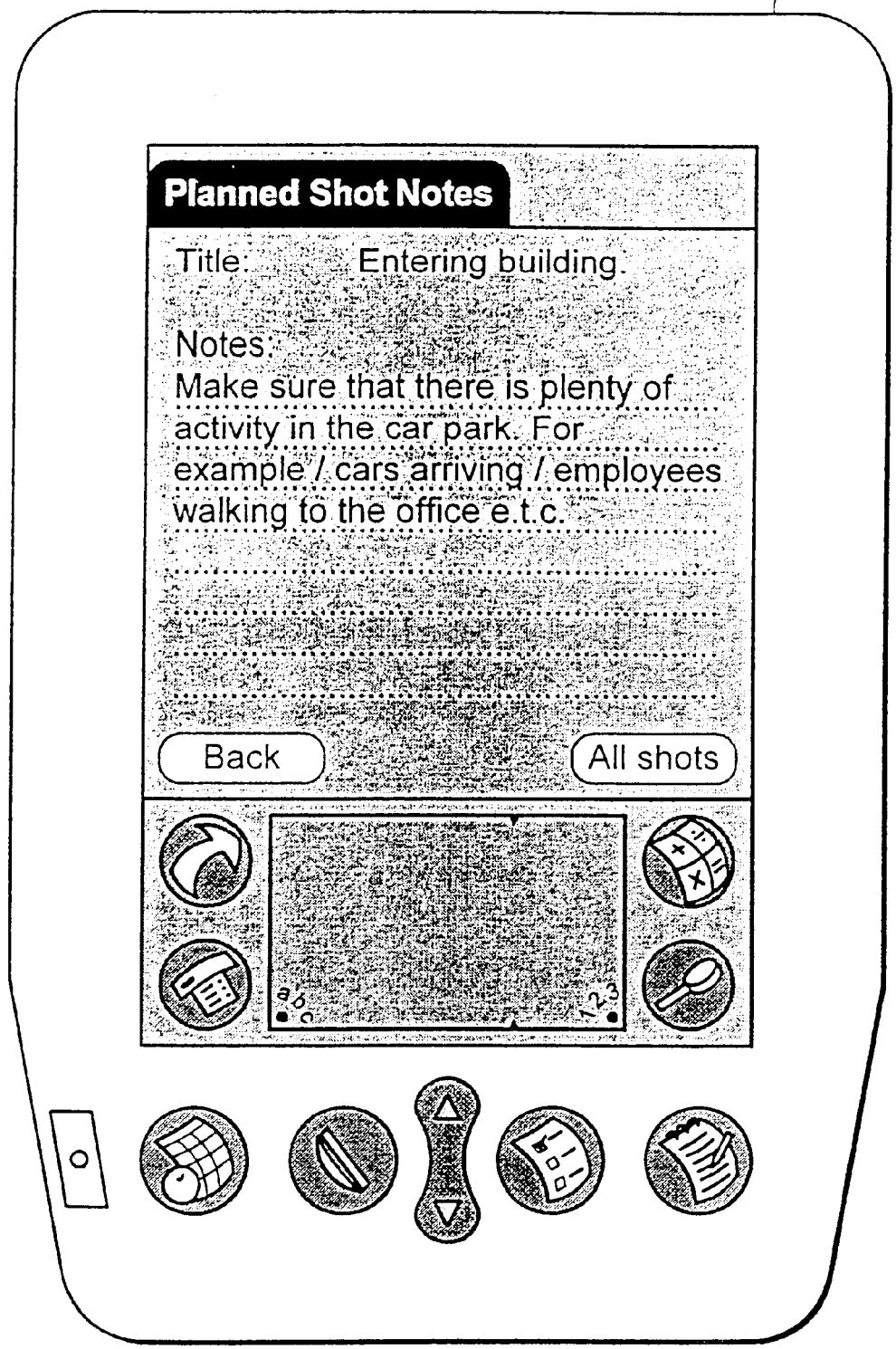
FIG. 3 is a pictorial representation providing an example of the form of the PDA shown in FIG. 1.

In the first column of the table below the event which will be captured by the camera and for which audio/video material will be generated is shown. Each of the events which is defined in a hierarchy is provided with an identification number. Correspondingly, in the second column notes are provided in order to direct or remind the director of the content of the planned shot or scene. For example, in the first row the audio/video production is identified as being a news story, reporting the disposal of Rover by BMW. In the extract of the planning information shown in the table below, there are three scenes, each of which is provided with a unique identification number. Each of these scenes are "Outside Long Bridge", "BMW HQ Munich" and "Interview with Minister". Correspondingly for each scene a number of shots are identified and these are shown below each of the scenes with a unique shot identification number. Notes corresponding to the content of each of these shots are also entered in the second column. So, for example, for the first scene "Outside Long Bridge", three shots are identified which are "Long Bridge BMW", "Workers leaving shift" and "Workers in car park". With this information loaded onto the PDA, the director or indeed a single camera man may take the PDA out to the place where the new story is to be shot, so that the planned audio/video material can be gathered. An illustration of the form of the PDA with the graphical user interface displaying this information is shown in FIG. 3.

As indicated in FIG. 1, the PDA 112 is arranged to communicate data to the camera 111. To this end the meta data generation processor 128 is arranged to communicate data with the PDA 112 via the interface 118. The interface 118 maybe for example an infra-red link 119 providing wireless communications in accordance with a known standard. The PDA and the parts of the camera associated with generating meta data which are shown in FIG. 2 are shown in more detail in FIG. 4.

Figure 4:
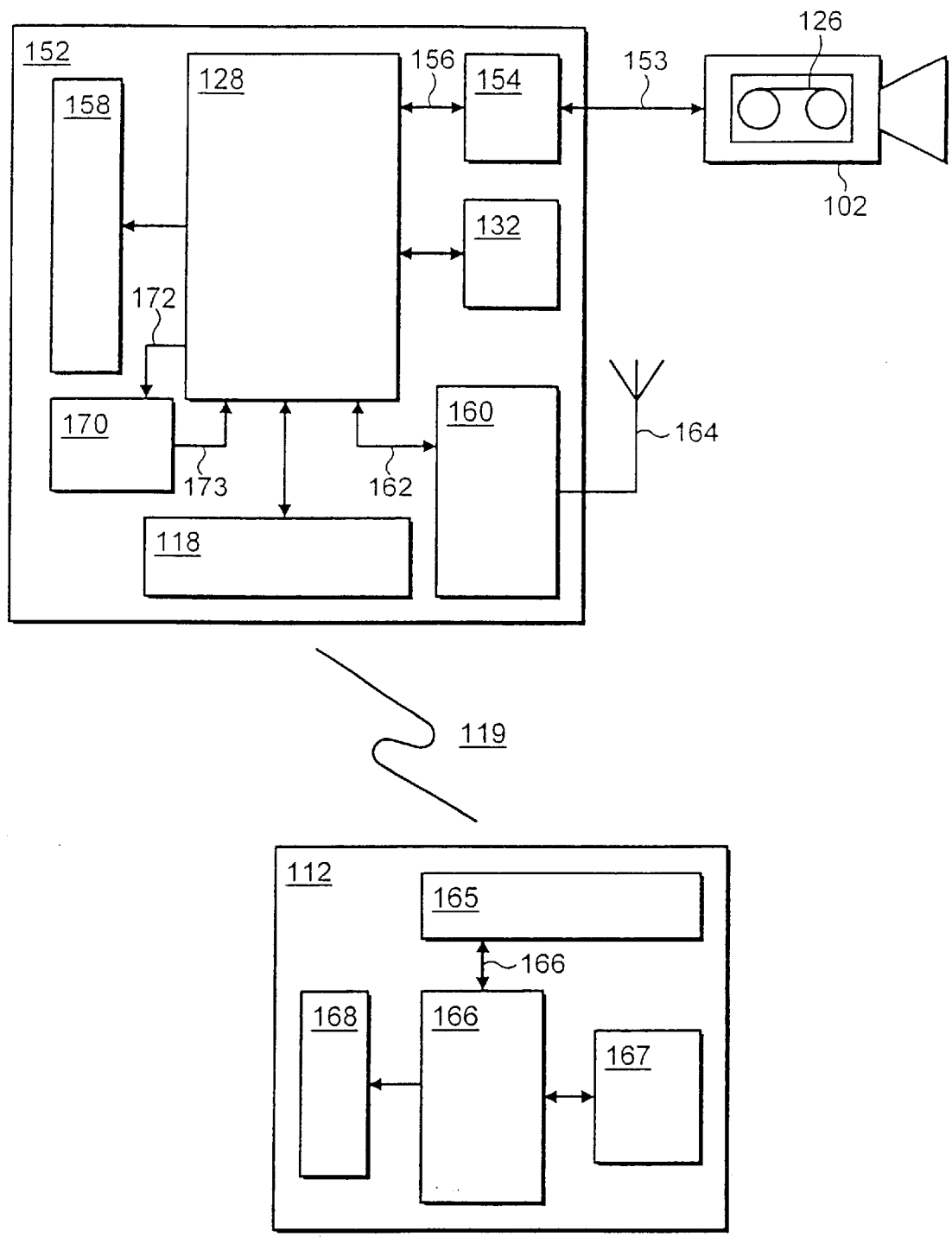
FIG. 4 is a schematic block diagram of a further example arrangement of parts of a video camera and some of the parts of the video camera associated with generating and processing meta data as a separate acquisition unit associated with a further example PDA.

In FIG. 4 the parts of the camera which are associated with generating meta data and communicating with the PDA 112 are shown in a separate acquisition unit 152. However it will be appreciated that the acquisition unit 152 could also be embodied within the camera 102. The acquisition unit 152 comprises the meta data generation processor 128, and the data store 132. The acquisition processor 152 also includes the clock 136 and the sensors 138, 140, 142 although for clarity these are not shown in FIG. 4. Alternatively, some or all of these features which are shown in FIG. 2 will be embodied within the camera 102 and the signals which are required to define the meta data such as the time codes and the audio/video signals themselves may be communicated via a communications link 153 which is coupled to an interface port 154. The meta data generation processor 128 is therefore provided with access to the time codes and the audio/video material as well as other parameters used in generating the audio/video material. Signals representing the time codes end parameters as well as the audio/video signals are received from the interface port 154 via the interface channel 156. The acquisition unit 152 is also provided with a screen (not shown) which is driven by a screen driver 158. Also shown in FIG. 4 the acquisition unit is provided with a communications processor 160 which is coupled to the meta data generation processor 128 via a connecting channel 162. Communications is effected by the communications processor 160 via a radio frequency communications channel using the antennae 164. A pictorial representation of the acquisition unit 152 is shown in FIG. 5.

The PDA 112 is also shown in FIG. 4. The PDA 112 is correspondingly provided with an infra-red communications port 165 for communicating data to and from the acquisition unit 152 via an infra-red link 119. A data processor 166 within the PDA 112 is arranged to communicate data to and from the infra-red port 165 via a connecting channel 166. The PDA 112 is also provided with a data store 167 and a screen driver 168 which are connected to the data processor 166.

Figure 5:
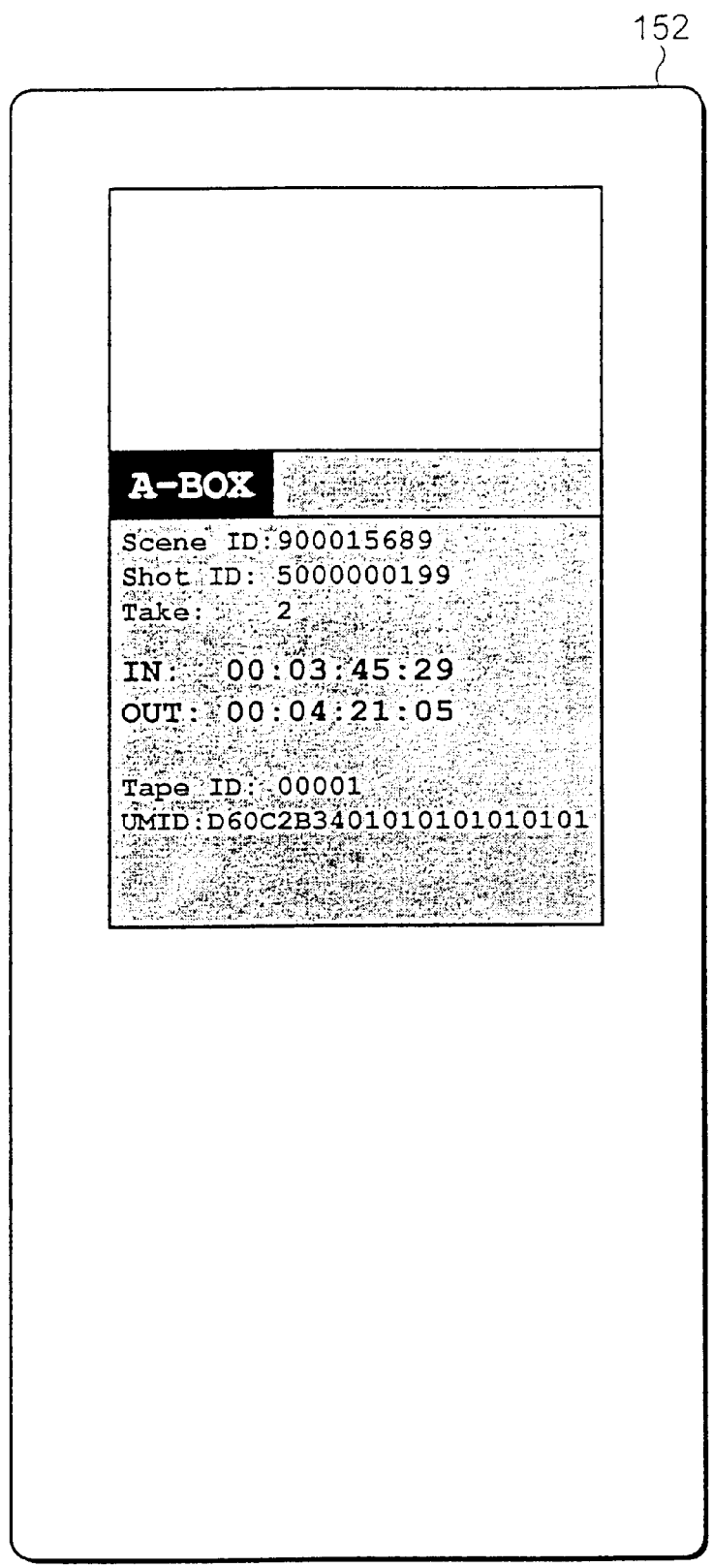
FIG. 5 is a pictorial representation providing an example of the form of the acquisition unit shown in FIG. 4.
Figure 6:
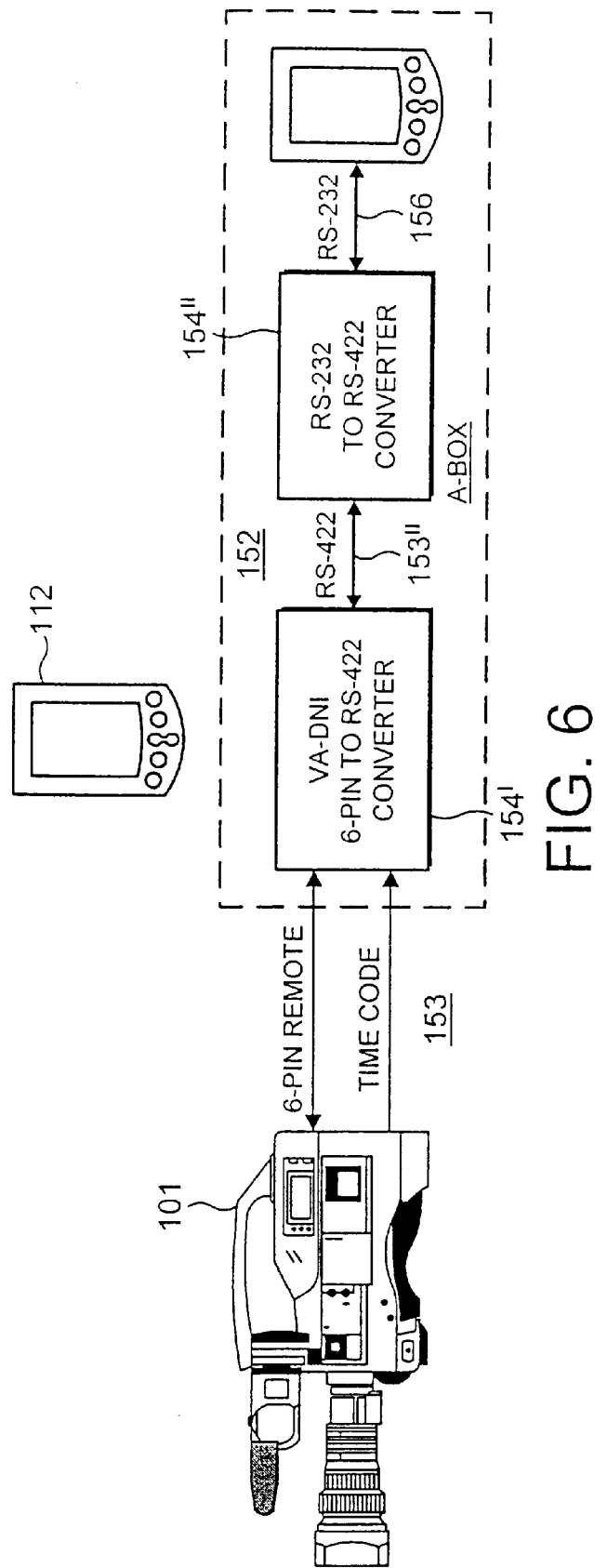
FIG. 6 is a part schematic part pictorial representation illustrating an example of the connection between the acquisition unit and the video camera of FIG. 4.

The pictorial representation of the PDA 112 shown in FIG. 3 and the acquisition unit shown in FIG. 5 provide an illustration of an example embodiment of the present invention. A schematic diagram illustrating the arrangement and connection of the PDA 112 and the acquisition unit 152 is shown in FIG. 6. In the example shown in FIG. 6 the acquisition unit 152 is mounted on the back of a camera 101 and coupled to the camera via a six pin remote connector and to a connecting channel conveying the external signal representative of the time code recorded onto the recording tape. Thus, the six pin remote connector and the time code indicated as arrow lines form the communications channel 153 shown in FIG. 4. The interface port 154 is shown in FIG. 6 to be a VA to DN1 conversion comprising an RM-P 9/LTC to RS422 converter 154. RM-P9 is a camera remote control protocol, whereas LTC is Linear Time Code in the form of an analogue signal. This is arranged to communicate with a RS422 to RS232 converter 154" via a connecting channel which forms part of the interface port 154. The converter 154" then communicates with the meta data generation processor 128 via the connecting channel 156 which operates in accordance with the RS 232 standard.

Returning to FIG. 4, the PDA 112 which has been loaded with the pre-planned production information is arranged to communicate the current scene and shot for which audio/video material is to be generated by communicating the next shot ID number via the infra-red link 119. The pre-planned information may also have been communicated to the acquisition unit 152 and stored in the data store 132 via a separate link or via the infra-red communication link 119. However in effect the acquisition unit 152 is directed to generate meta data in association with the scene or shot ID number which is currently being taken. After receiving the information of the current shot the camera 102 is then operated to make a "take of the shot". The audio/video material of the take is recorded onto the recording tape 126 with corresponding time codes. These time codes are received along with the audio/video material via the interface port 154 at the meta data generation processor 128. The meta data generation processor 128 having been informed of the current pre-planned shot now being taken logs the time codes for each take of the shot. The meta data generation processor therefore logs the IN and OUT time codes of each take and stores these in the data store 132.

The information generated and logged by the meta data generation processor 128 is shown in the table below. In the first column the scene and shot are identified with the corresponding ID numbers, and for each shot several takes are made by the camera operator which are indicated in a hierarchical fashion. Thus, having received information from the PDA 112 of the current shot, each take made by the camera operator is logged by the meta data generation processor 128 and the IN and OUT points for this take are shown in the second and third columns and stored in the data store 132. This information may also be displayed on the screen of the acquisition unit 152 as shown in FIG. 5. Furthermore, the meta data generation processor 128 as already explained generates the UMID for each take for the audio/video material generated during the take. The UMID for each take forms the fourth column of the table. Additionally, in some embodiments, to provide a unique identification of the tape once which the material is recorded, a tape identification is generated and associated with the meta data. The tape identification may be written on to the tape, or stored on a random access memory chip which is embodied within the video tape cassette body. This random access memory chip is known as a TELEFILE (RTM) system which provides a facility for reading the tape ID number remotely. The tape ID is written onto the magnetic tape 126 to uniquely identify this tape. In preferred embodiments the TELEFILE (RTM) system is provided with a unique number which manufactured as part of the memory and so can be used as the tape ID number. In other embodiments the TELEFILE (RTM) system provides automatically the IN/OUT time codes of the recorded audio/video material items.

In one embodiment the information shown in the table below is arranged to be recorded onto the magnetic tape in a separate recording channel. However, in other embodiments the meta data shown in the table is communicated separately from the tape 126 using either the communications processor 160 or the infra-red link 119. The meta data maybe received by the PDA 112 for analysis and may be further communicated by the PDA.

| Scene ID: 900015689 | Tape ID: 00001 | | UMID: |
|---|---|---|---|
| Shot 5000000199 | | | |
| Take 1 | IN: 00:03:45:29 | OUT: 00:04:21:05 | 060C23B340.. |
| Take 2 | IN: 00:04:21:20 | OUT: 00:04:28:15 | 060C23B340.. |
| Take 3 | IN: 00:04:28:20 | OUT: 00:05:44:05 | 060C23B340.. |
| Shot 5000000200 | | | |
| Take 1 | IN: 00:05:44:10 | OUT: 00:08:22:05 | 060C23B340.. |
| Take 2 | IN: 00:08:22:10 | OUT: 00:08:23:05 | 060C23B340.. |

The communications processor 160 may be arranged in operation to transmit the meta data generated by the meta data generation processor 128 via a wireless communications link. The meta data maybe received via the wireless communications link by a remotely located studio which can then acquire the meta data and process this meta data ahead of the audio/video material recorded onto the magnetic tape 126. This provides an advantage in improving the rate at which the audio/video production may be generated during the post production phase in which the material is edited.

A further advantageous feature provided by embodiments of the present invention is an arrangement in which a picture stamp is generated at certain temporal positions within the recorded audio/video signals. A picture stamp is known to those skilled in the art as being a digital representation of an image and in the present example embodiment is generated from the moving video material generated by the camera. The picture stamp may be of lower quality in order to reduce an amount of data required to represent the image from the video signals. Therefore the picture stamp may be compression encoded which may result in a reduction in quality. However a picture stamp provides a visual indication of the content of the audio/video material and therefore is a valuable item of meta data. Thus, the picture stamp may for example be generated at the IN and OUT time codes of a particular take. Thus, the picture stamps may be associated with the meta data generated by the meta data generation processor 128 and stored in the data store 132. The picture stamps are therefore associated with items of meta data such as, for example, the time codes which identify the place on the tape where the image represented by the picture stamp is recorded. The picture stamps may be generated with the "Good Shot" markers. The picture stamps are generated by the meta data generation processor 128 from the audio/video signals received via the communications link 153. The meta data generation processor therefore operates to effect a data sampling and compression encoding process in order to produce the picture stamps. Once the picture stamps have been generated they can be used for several purposes. They may be stored in a data file and communicated separately from the tape 126, or they may be stored on the tape 126 in compressed form in a separate recording channel. Alternatively in preferred embodiments picture stamps may be communicated using the communications processor 160 to the remotely located studio where a producer may analysis the picture stamps. This provides the producer with an indication as to whether the audio/video material generated by the camera operator is in accordance with what is required.

In a yet further embodiment, the picture stamps are communicated to the PDA 112 and displayed on the PDA screen. This may be effected via the infra-red port 119 or the PDA may be provided with a further wireless link which can communicate with the communications processor 160. In this way a director having the hand held PDA 112 is provided with an indication of the current audio/video content generated by the camera. This provides an immediate indication of the artist and aesthetic quality of the audio/video material currently being generated. As already explained the picture stamps are compression encoded so that they may be rapidly communicated to the PDA.

A further advantage of the acquisition unit 152 shown in FIG. 4 is that the editing process is made more efficient by providing the editor at a remotely located studio with an indication of the content of the audio/video material in advance of receiving that material. This is because the picture stamps are communication with the meta data via a wireless link so that the editor is provided with an indication of the content of the audio/video material in advance of receiving the audio/video material itself. In this way the bandwidth of the audio/video material can remain high with a correspondingly high quality whilst the meta data and picture stamps are at a relatively low band width providing relatively low quality information. As a result of the low band width the meta data and picture stamps may be communicated via a wireless link on a considerably lower band width channel. This facilitates rapid communication of the meta data describing content of the audio/video material.

The picture stamps generated by the meta data generation processor 128 can be at any point during the recorded audio/video material. In one embodiment the picture stamps are generated at the IN and OUT points of each take. However in other embodiments of the present invention as an activity processor 170 is arranged to detect relative activity within the video material. This is effected by performing a process in which a histogram of the color components of the images represented by the video signal is compiled and the rate of change of the color components determined and changes in these color components used to indicate activity within the image. Alternatively or in addition, motion vectors within the image are used to indicate activity. The activity processor 176 then operates to generate a signal indicative of the relative activity within the video material. The meta data generation processor 128 then operates in response to the activity signal to generate picture stamps such more picture stamps are generated for greater activity within the images represented by the video signals.

In an alternative embodiment of the present invention the activity processor 170 is arranged to receive the audio signals via the connecting channel 172 and to recognise speech within the audio signals. The activity processor 170 then generates content data representative of the content of this speech as text. The text data is then communicated to the data processor 128 which may be stored in the data store 132 or communicated with other meta data via the communications processor 160 in a similar way to that already explained for the picture stamps.

Figure 7:
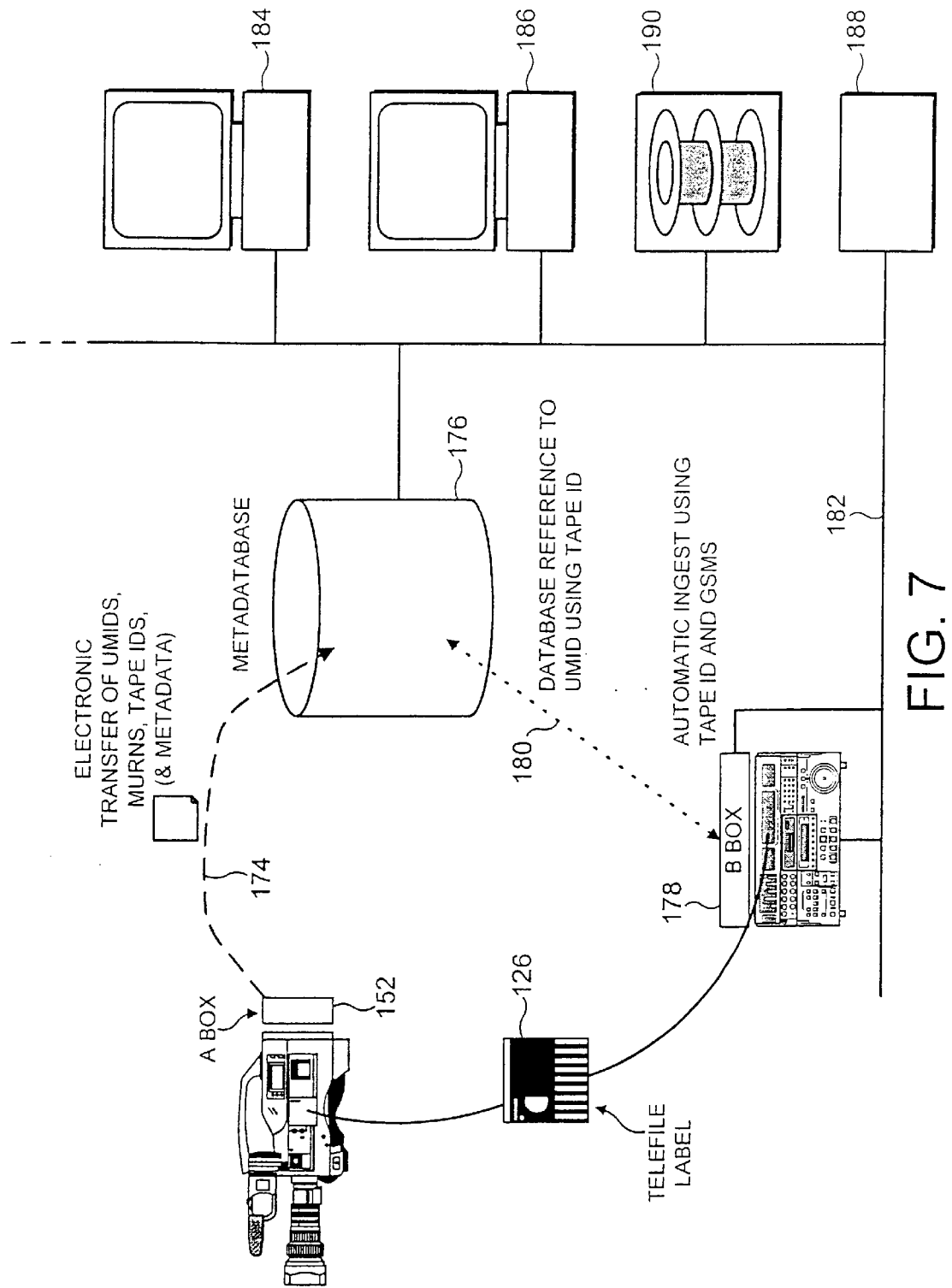
FIG. 7 is a part schematic block diagram of an ingestion processor coupled to a network, part flow diagram illustrating the ingestion of meta data and audio/video material items.

FIG. 7 provides a schematic representation of a post production process in which the audio/video material is edited to produce an audio/video program. As shown in FIG. 7 the meta data, which may include picture stamps and/or the speech content information is communicated from the acquisition unit 152 via a separate route represented by a broken line 174, to a meta data database 176. The route 174 may be representative of a wireless communications link formed by for example UMTS, GSM or the like.

The database 176 stores meta data to be associated with the audio/video material. The audio/video material in high quality form is recorded onto the tape 126. Thus the tape 126 is transported back to the editing suite where it is ingested by an ingestion processor 178. The tape identification (tape ID) recorded onto the tape 126 or other meta data providing an indication of the content of the audio/video material is used to associate the meta data stored in the data store 176 with the audio/video material on the tape as indicated by the broken line 180.

As will be appreciated although the example embodiment of the present invention uses a video tape as the recording medium for storing the audio/video signals, it will be understood that alternative recording medium such as magnetic disks and random access memories may also be used.

Ingestion Processor

FIG. 7 provides a schematic representation of a post production process in which the audio/video material is edited to produce an audio/video program. As shown in FIG. 7 the meta data, which may include picture stamps and/or the speech content information is communicated from the acquisition unit 152 via a separate route represented by a broken line 174, to a meta data database 176. The route 174 may be representative of a wireless communications link formed by for example UMTS, GSM or the like.

The database 176 stores meta data to be associated with the audio/video material. The audio/video material in high quality form is recorded onto the tape 126. Thus the tape 126 is transported back to the editing suite where it is ingested by an ingestion processor 178. The tape identification (tape ID) recorded onto the tape 126 or other meta data providing an indication of the content of the audio/video material is used to associate the meta data stored in the data store 176 with the audio/video material on the tape as indicated by the broken line 180.

The ingestion processor 178 is also shown in FIG. 7 to be connected to a network formed from a communications channel represented by a connecting line 182. The connecting line 182 represents a communications channel for communicating data to items of equipment, which form an inter-connected network. To this end, these items of equipment are provided with a network card which may operate in accordance with a known access technique such as Ethernet, RS422 and the like. Furthermore, as will be explained shortly, the communications network 182 may also provide data communications in accordance with the Serial Digital Interface (SDI) or the Serial Digital Transport Interface (SDTI).

Also shown connected to the communications network 182 is the meta data database 176, and an audio/video server 190, into which the audio/video material is ingested. Furthermore, editing terminals 184, 186 are also connected to the communications channel 182 along with a digital multi-effects processor 188.

The communications network 182 provides access to the audio/video material present on tapes, discs or other recording media which are loaded into the ingestion processor 178.

The meta data database 176 is arranged to receive meta data via the route 174 describing the content of the audio/video material recorded on to the recording media loaded into the ingestion processor 178.

As will be appreciated although in the example embodiment a video tape has been used as the recording medium for storing the audio/video signals, it will be understood that alternative recording media such as magnetic disks and random access memories may also be used, and that video tape is provided as an illustrative example only.

The editing terminals 184, 186 digital multi-effects processor 188 are provided with access to the audio/video material recorded on to the tapes loaded into the ingestion processor 178 and the meta data describing this audio/video material stored in the meta data database 176 via the communications network 182. The operation of the ingestion processor with 178 in combination with the meta data database 176 will now be described in more detail.

Figure 8:
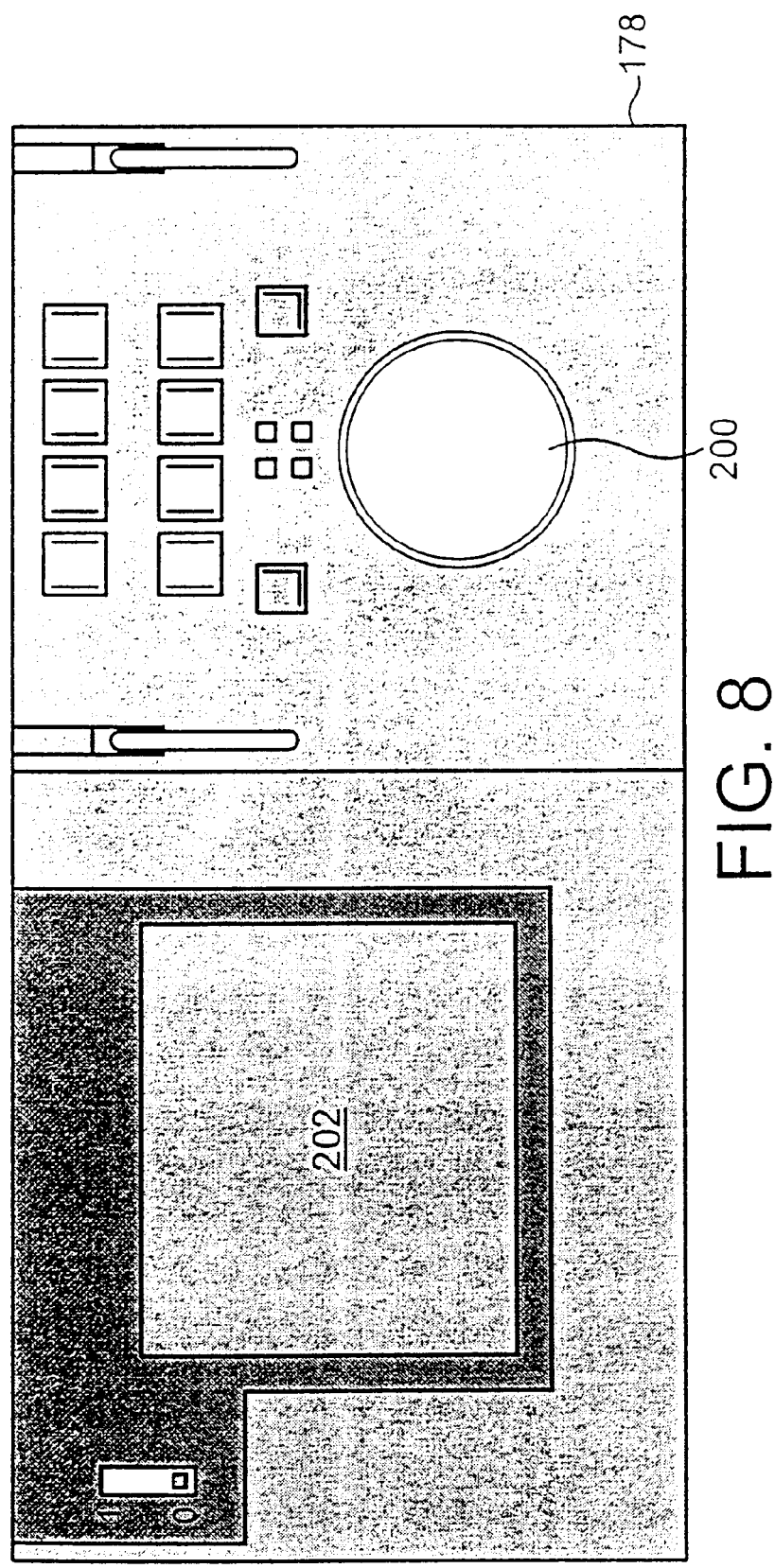
FIG. 8 is a pictorial representation of the ingestion processor shown in FIG. 7.

FIG. 8 provides an example representation of the ingestion processor 178. In FIG. 8 the ingestion processor 178 is shown to have a jog shuttle control 200 for navigating through the audio/video material recorded on the tapes loaded into video tape recorders/reproducers forming part of the ingestion processor 178. The ingestion processor 178 also includes a display screen 202 which is arranged to display picture stamps which describe selected parts of the audio/video material. The display screen 202 also acts as a touch screen providing a user with the facility for selecting the audio/video material by touch. The ingestion processor 178 is also arranged to display all types of meta data on the screen 202 which includes script, camera type, lens types and UMIDs.

Figure 9:
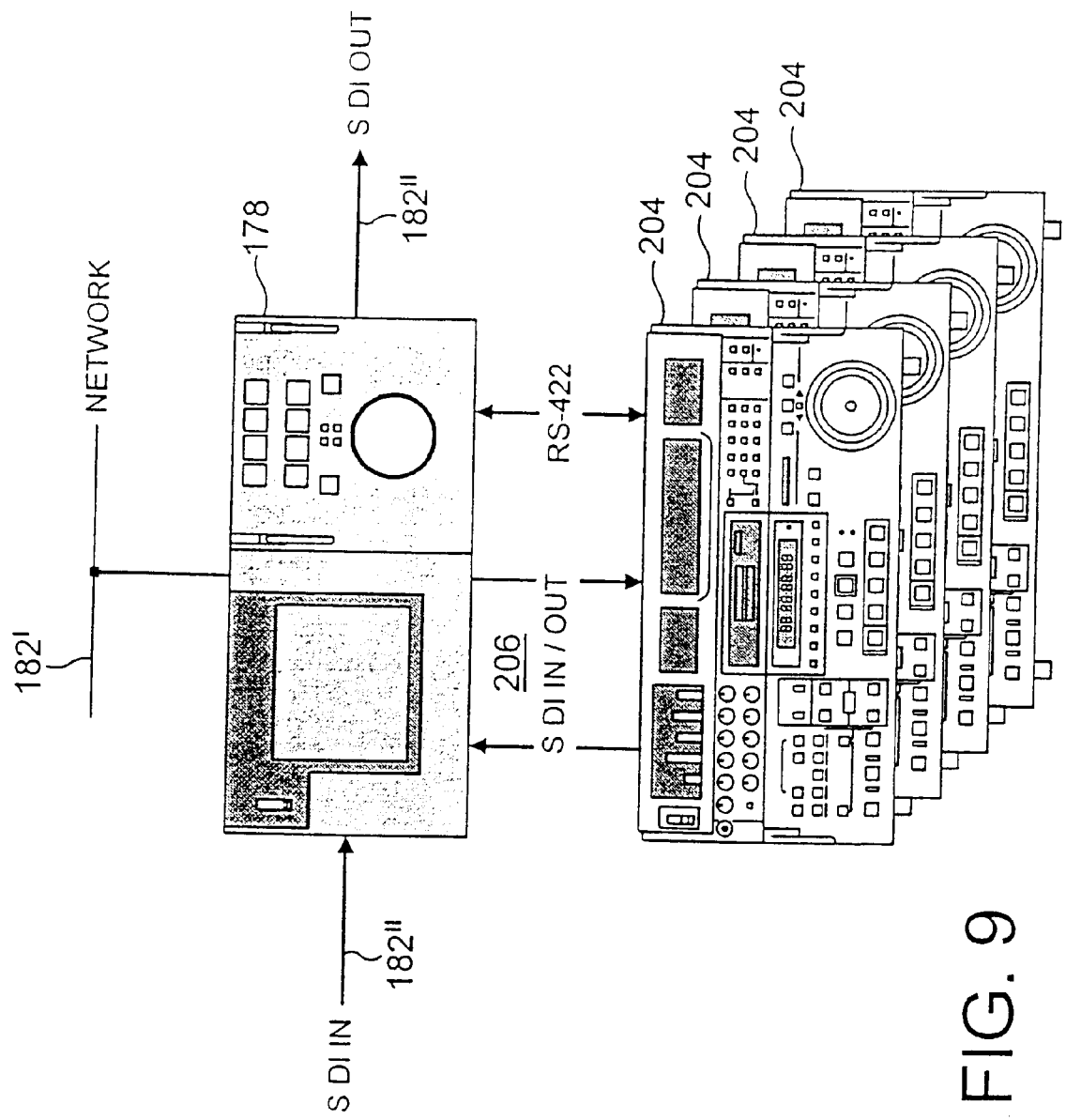
FIG. 9 is a part schematic block diagram part pictorial representation of the ingestion processor shown in FIGS. 7 and 8 shown in more detail.

As shown in FIG. 9, the ingestion processor 178 may include a plurality of video tape recorders/reproducers into which the video tapes onto which the audio/video material is recorded may be loaded in parallel. In the example shown in FIG. 9, the video tape recorders 204 are connected to the ingestion processor 178 via an RS422 link and an SDI IN/OUT link. The ingestion processor 178 therefore represents a data processor which can access any of the video tape recorders 204 in order to reproduce the audio/video material from the video tapes loaded into the video tape recorders. Furthermore, the ingestion processor 178 is provided with a network card in order to access the communications network 182. As will be appreciated from FIG. 9 however, the communications channel 182 is comprised of a relatively low band width data communications channel 182' and a high band width SDI channel 182" for use in streaming video data. Correspondingly, therefore the ingestion processor 178 is connected to the video tape recorders 204 via an RS422 link in order communicate requests for corresponding items of audio/video material. Having requested these items of audio/video material, the audio/video material is communicated back to the ingestion processor 178 via an SDI communication link 206 for distribution via the SDI network. The requests may for example include the UMID which uniquely identifies the audio/video material item(s).

Figure 10:
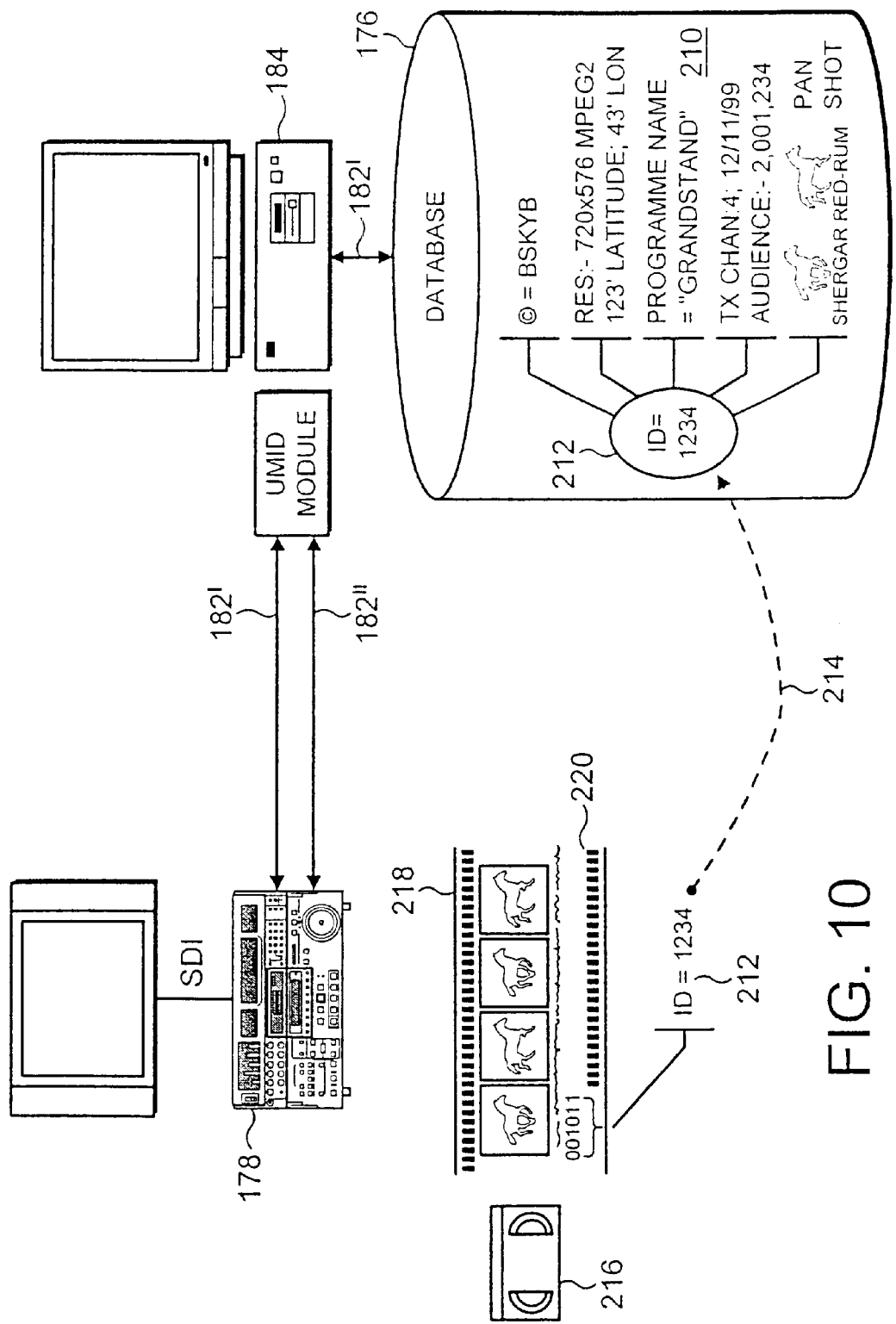
FIG. 10 is a schematic block diagram showing the ingestion processor shown in operative association with the database of FIG. 7.

The operation of the ingestion processor in association with the meta data database 176 will now be explained with reference to FIG. 10. In FIG. 10 the meta data database 176 is shown to include a number of items of meta data 210 associated with a particular tape ID 212. As shown by the broken line headed arrow 214, the tape ID 212 identifies a particular video tape 216, on which the audio/video material corresponding to the meta data 210 is recorded. In the example embodiment shown in FIG. 10, the tape ID 212 is written onto the video tape 218 in the linear time code area 220. However it will be appreciated that in other embodiments, the tape ID could be written in other places such as the vertical blanking portion. The video tape 216 is loaded into one of the video tape recorders 204 forming part of the ingestion processor 178.

In operation one of the editing terminals 184 is arranged to access the meta data database 176 via the low band width communications channel 182' the editing terminal 184 is therefore provided with access to the meta data 210 describing the content of the audio/video material recorded onto the tape 216. The meta data 210 may include such as the copyright owner "BSkyB", the resolution of the picture and the format in which the video material is encoded, the name of the program, which is in this case "Grandstand", and information such as the date, time and audience. Meta data may further include a note of the content of the audio/video material.

Each of the items of audio/video material is associated with a UMID, which idenifies the audio/video material. As such, the editing terminal 184 can be used to identify and select from the meta data 210 the items of audio/video material which are required in order to produce a program. This material may be identified by the UMID associated with the material. In order to access the audio/video material to produce the program, the editing terminal 184 communicates a request for this material via the low band width communications network 182. The request includes the UMID or the UMIDs identifying the audio/video material item(s). In response to the request for audio/video material received from the editing terminal 184, the ingestion processor 178 is arranged to reproduce selectively these audio/video material items identified by the UMID or UMIDs from the video tape recorder into which the video cassette 216 is loaded. This audio/video material is then streamed via the SDI network 182" back to the editing terminal 184 to be incorporated into the audio/video production being edited. The streamed audio/video material is ingested into the audio/video server 190 from where the audio/video can be stored and reproduced.

Figure 11:
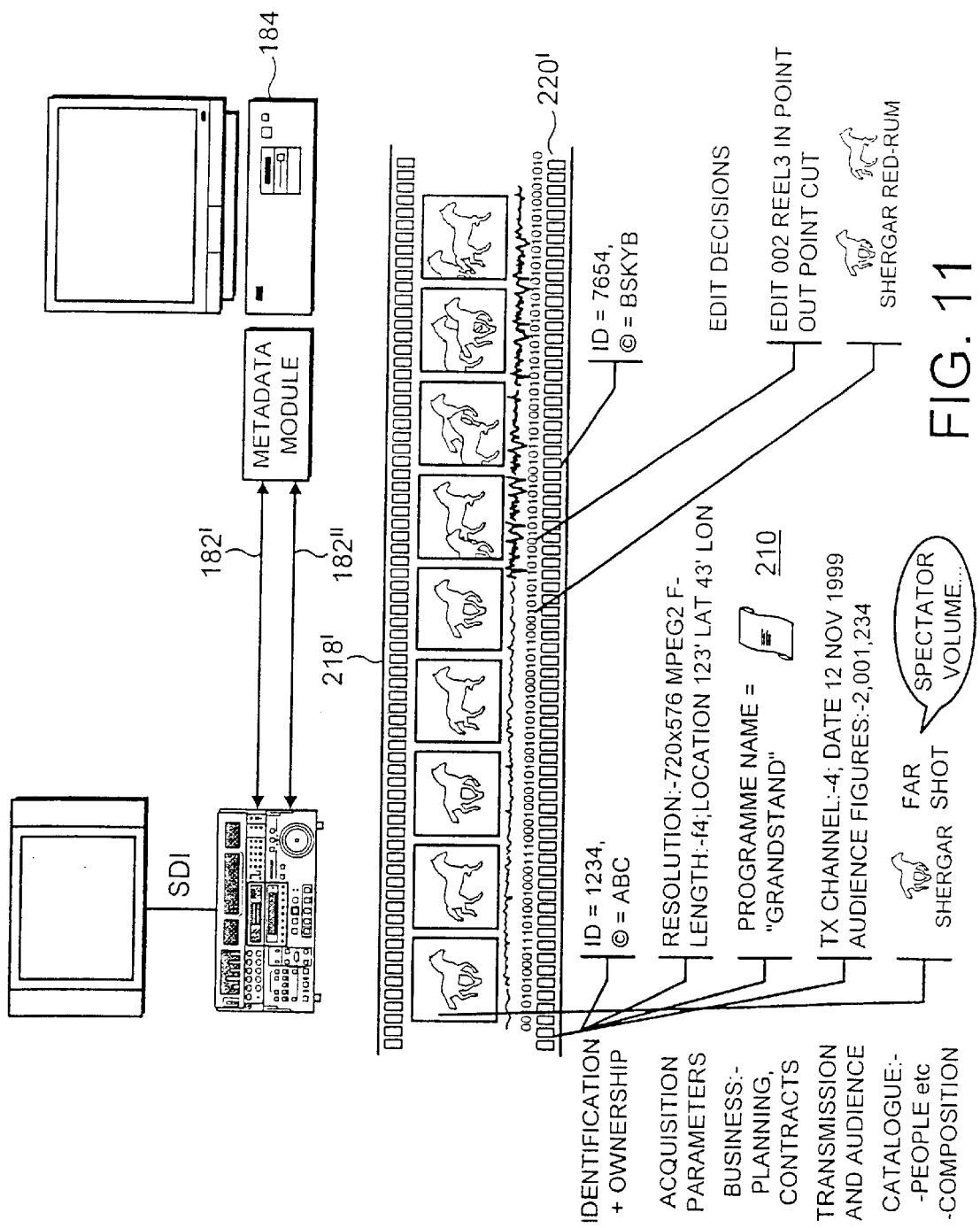
FIG. 11 is a schematic block diagram showing a further example of the operation of the ingestion processor shown FIG. 7.

FIG. 11 provides an alternative arrangement in which the meta data 210 is recorded onto a suitable recording medium with the audio/video material. For example the meta data 210 could be recorded in one of the audio tracks of the video tape 218'. Alternatively, the recording medium may be an optical disc or magnetic disc allowing random access and providing a greater capacity for storing data. In this case the meta data 210 may be stored with the audio/video material.

In a yet further arrangement, some or all of the meta data may be recorded onto the tape 216. This may be recorded, for example, into the linear recording track of the tape 218. Some meta data related to the meta data recorded onto the tape may be conveyed separately and stored in the database 176. A further step is required in order to ingest the meta data and to this end the ingestion processor 178 is arranged to read the meta data from the recording medium 218' and convey the meta data via the communications network 182' to the meta data database 176. Therefore, it will be appreciated that the meta data associated with the audio/video material to be ingested by the ingestion processor 178 may be ingested into the database 176 via a separate medium or via the recording medium on which the audio/video material is also recorded.

The meta data associated with the audio/video material may also include picture stamps which represent low quality representations of the images at various points throughout the video material. These may be presented at the touch screen 202 on the ingestion processor 178. Furthermore these picture stamps may be conveyed via the network 182' to the editing terminals 184, 186 or the effects processor 188 to provide an indication of the content of the audio/video material. The editor is therefore provided with a pictorial representation for the audio/video material and from this a selection of an audio/video material items may be made. Furthermore, the picture stamp may stored in the database 176 as part of the meta data 210. The editor may therefore retrieve a selected item for the corresponding picture stamp using the UMID which is associated with the picture stamp.

In other embodiments of the invention, the recording medium may not have sufficient capacity to include picture stamps recorded with the audio/video material. This is likely to be so if the recording medium is a video tape 216. It is particularly appropriate in this case, although not exclusively so, to generate picture stamps before or during ingestion of the audio/video material.

Returning to FIG. 7, in other embodiments, the ingestion processor 178 may include a pre-processing unit. The pre-processing unit embodied within the ingestion processor 178 is arranged to receive the audio/video material recorded onto the recording medium which, in the present example is a video tape 126. To this end, the pre-processing unit may be provided with a separate video recorder/reproducer or may be combined with the video tape recorder/reproducer which forms part of the ingestion processor 178. The pre-processing unit generates picture stamps associated with the audio/video material. As explained above, the picture stamps are used to provide a pictorial representation of the content of the audio/video material items. However in accordance with a further embodiment of the present invention the pre-processing unit operates to process the audio/video material and generate an activity indicator representative of relative activity within the content of the audio/video material. This may be achieved for example using a processor which operates to generate an activity signal in accordance with a histogram of color components within the images represented by the video signal and to generate the activity signals in accordance with a rate of change of the color histogram components. The pre-processing unit then operates to generate a picture stamp at points throughout the video material where there are periods of activity indicated by the activity signal. This is represented in FIG. 12. In FIG. 12A picture stamps 224 are shown to be generated along a line 226 which is representing time within the video signal. As shown in FIG. 12A the picture stamps 224 are generated at times along the time line 226 where the activity signal represented as arrows 228 indicates events of activity. This might be for example someone walking into and out of the field of view of the camera where there is a great deal of motion represented by the video signal. To this end, the activity signal may also be generated using motion vectors which may be, for example, the motion vectors generated in accordance with the MPEG standard.

In other embodiments of the invention, the pre-processor may generate textual information corresponding to speech present within the audio signal forming part of the audio/video material items stored on the tape 126. The textual information may be generated instead of the picture stamps or in addition to the picture stamps. In this case, text may be generated for example for the first words of sentences and/or the first activity of a speaker. This is detected from the audio signals present on the tape recording or forming part of the audio/video material. The start points where text is to be generated is represented along the time line 226 as arrows 230. Alternatively the text could be generated at the end of sentences or indeed at other points of interest within the speech.

At the detected start of the speech, a speech processor operates to generate a textual representation of the content of the speech. To this end, the time line 226 shown in FIG. 12B is shown to include the text 232 corresponding to the content of the speech at the start of activity periods of speech.

The picture stamps and textual representation of the speech activity generated by the pre-processor is communicated via the communications channel 182 to the meta data database 176 and stored. The picture stamps and text are stored in association with the UMID identifying the corresponding items of audio/video material from which the picture stamps 224 and the textual information 232 were generated. This therefore provides a facility to an editor operating one of the editing terminals 184, 186 to analyse the content of the audio/video material before it is ingested using the ingestion processor 178. As such the video tape 126 is loaded into the ingestion processor 178 and thereafter the audio/video material can be accessed via the network communications channel 182. The editor is therefore provided with an indication, very rapidly, of the content of the audio/video material and so may ingest only those parts of the material, which are relevant to the particular material items required by the editor. This has a particular advantage in improving the efficiency with which the editor may produce an audio/video production.

In an alternative embodiment, the pre-processor may be a separate unit and may be provided with a screen on which the picture stamps and/or text information are displayed, and a means such as, for example, a touch screen, to provide a facility for selecting the audio/video material items to be ingested.

In a further embodiment of the invention, the ingestion processor 178 generates meta data items such as UMIDs whilst the audio/video material is being ingested. This may required because the acquisition unit in the camera 152 is not arranged to generate UMIDs, but does generate a Unique Material Reference Number (MURN). The MURN is generated for each material item, such as a take. The MURN is arranged to be considerably shorter than a UMID and can therefore be accommodated within the linear time code of a video tape, which is more difficult for UMIDs because these are larger. Alternatively the MURN may be written into a TELEFILE (RTM) label of the tape. The MURN provides a unique identification of the audio/video material items present on the tape. The MURNs may be communicated separately to the database 176 as indicated by the line 174.

At the ingestion processor 178, the MURN for the material items are recovered from the tape or the TELEFILE label. For each MURN, the ingestion processor 178 operates to generate a UMID corresponding to the MURN. The UMIDs are then communicated with the MURN to the database 176, and are ingested into the database in association with the MURNs, which may be already present within the database 176.

Camera Meta Data

The following is provided, by way of example, to illustrate the possible types of meta data generated during the production of a programme, and one possible organisational approach to structuring that meta data.

Figure 13:
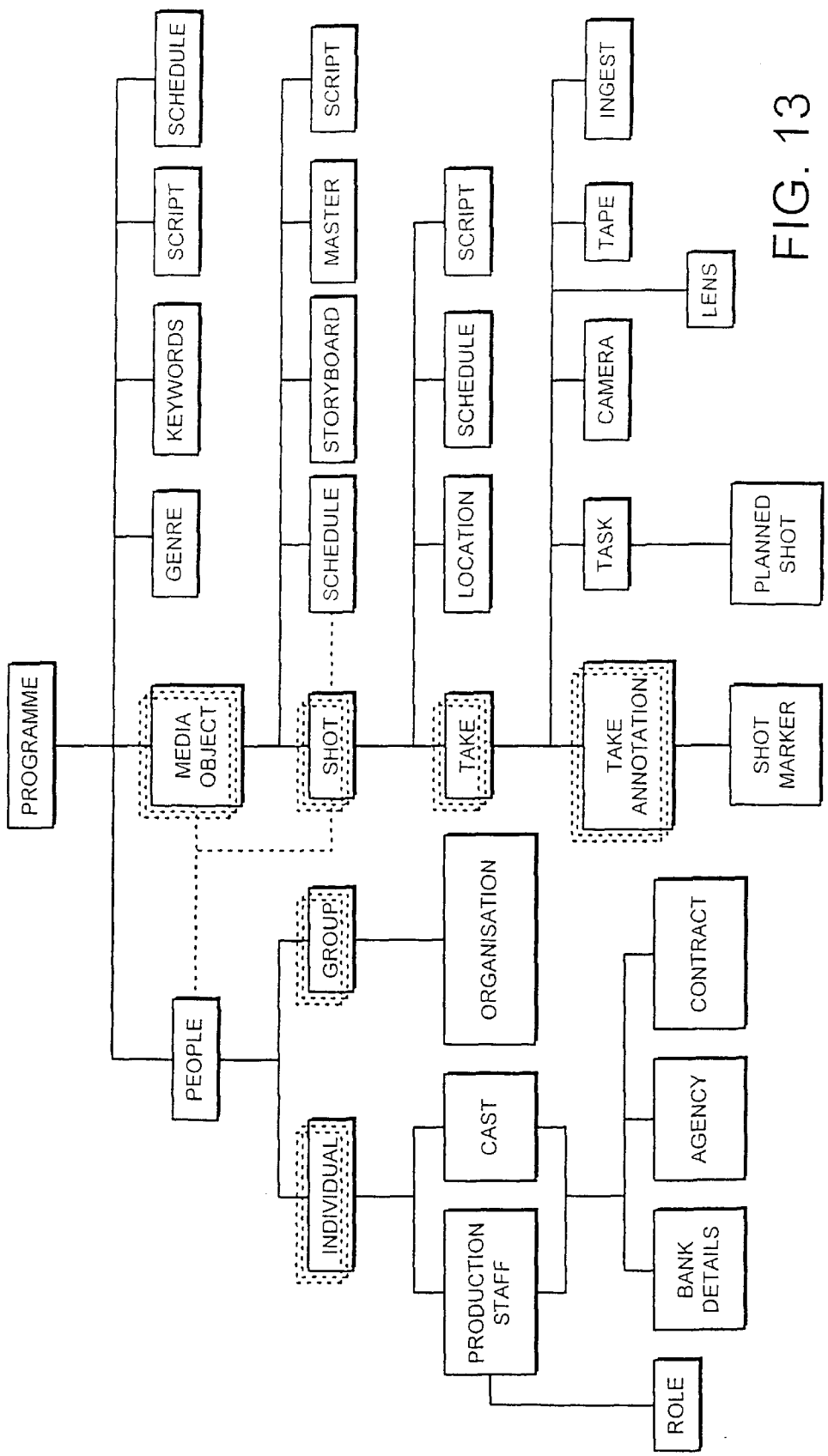

FIG. 13 illustrates an example structure for organising meta data. A number of tables each comprising a number of fields containing meta data are provided. The tables may be associated with each other by way of common fields within the respective tables, thereby providing a relational structure. Also, the structure may comprise a number of instances of the same table to represent multiple instances of the object that the table may represent. The fields may be formatted in a predetermined manner. The size of the fields may also be predetermined. Example sizes include "Int" which represents 2 bytes, "Long Int" which represents 4 bytes and "Double" which represents 8 bytes. Alternatively, the size of the fields may be defined with reference to the number of characters to be held within the field such as, for example, 8, 10, 16, 32, 128, and 255 characters.

Turning to the structure in more detail, there is provided a Programme Table. The Programme Table comprises a number of fields including Programme ID (PID), Title, Working Title, Genre ID, Synopsis, Aspect Ratio, Director ID and Picturestamp. Associated with the Programme Table is a Genre Table, a Keywords Table, a Script Table, a People Table, a Schedule Table and a plurality of Media Object Tables.

The Genre Table comprises a number of fields including Genre ID, which is associated with the Genre ID field of the Programme Table, and Genre Description.

The Keywords Table comprises a number of fields including Programme ID, which is associated with the Programme ID field of the Programme Table, Keyword ID and Keyword.

The Script Table comprises a number of fields including Script ID, Script Name, Script Type, Document Format, Path, Creation Date, Original Author, Version, Last Modified, Modified By, PID associated with Programme ID and Notes. The People Table comprises a number of fields including Image.

The People Table is associated with a number of Individual Tables and a number of Group Tables. Each Individual Table comprises a number of fields including Image. Each Group Table comprises a number of fields including Image. Each Individual Table is associated with either a Production Staff Table or a Cast Table.

The Production Staff Table comprises a number of fields including Production Staff ID, Surname, Firstname, Contract ID, Agent, Agency ID, E-mail, Address, Phone Number, Role ID, Notes, Allergies, DOB, National Insurance Number and Bank ID and Picture Stamp.

The Cast Table comprises a number of fields including Cast ID, Surname, Firstname, Character Name, Contract ID, Agent, Agency ID, Equity Number, E-mail, Address, Phone Number, DOB and Bank ID and Picture Stamp. Associated with the Production Staff Table and Cast Table are a Bank Details Table and an Agency Table.

The Bank Details Table comprises a number of fields including Bank ID, which is associated with the Bank ID field of the Production Staff Table and the Bank ID field of the Cast Table, Sort Code, Account Number and Account Name.

The Agency Table comprises a number of fields including Agency ID, which is associated with the Agency ID field of the Production Staff Table and the Agency ID field of the Cast Table, Name, Address, Phone Number, Web Site and E-mail and a Picture Stamp. Also associated with the Production Staff Table is a Role Table.

The Role Table comprises a number of fields including Role ID, which is associated with the Role ID field of the Production Staff Table, Function and Notes and a Picture Stamp. Each Group Table is associated with an Organisation Table.

The Organisation Table comprises a number fields including Organisation ID, Name, Type, Address, Contract ID, Contact Name, Contact Phone Number and Web Site and a Picture Stamp.

Each Media Object Table comprises a number of fields including Media Object ID, Name, Description, Picturestamp, PID, Format, schedule ID, script ID and Master ID. Associated with each Media Object Table is the People Table, a Master Table, a Schedule Table, a Storyboard Table, a script table and a number of Shot Tables.

The Master Table comprises a number of fields including Master ID, which is associated with the Master ID field of the Media Object Table, Title, Basic UMID, EDL ID, Tape ID and Duration and a Picture Stamp.

The Schedule Table comprises a number of fields including Schedule ID, Schedule Name, Document Format, Path, Creation Date, Original Author, Start Date, End Date, Version, Last Modified, Modified By and Notes and PID which is associated with the programme ID.

The contract table contains: a contract ID which is associated with the contract ID of the Production staff, cast, and organisation tables; commencement date, rate, job title, expiry date and details.

The Storyboard Table comprises a number of fields including Storyboard ID, which is associated with the Storyboard ID of the shot Table, Description, Author, Path and Media ID.

Each Shot Table comprises a number of fields including Shot ID, PID, Media ID, Title, Location ID, Notes, Picturestamp, script ID, schedule ID, and description. Associated with each Shot Table is the People Table, the Schedule Table, script table, a Location Table and a number of Take Tables.

The Location Table comprises a number of fields including Location ID, which is associated with the Location ID field of the Shot Table, GPS, Address, Description, Name, Cost Per Hour, Directions, Contact Name, Contact Address and Contact Phone Number and a Picture Stamp.

Each Take Table comprises a number of fields including Basic UMID, Take Number, Shot ID, Media ID, Timecode IN, Timecode OUT, Sign Meta data, Tape ID, Camera ID, Head Hours, Videographer, IN Stamp, OUT Stamp. Lens ID, AUTOID ingest ID and Notes. Associated with each Take Table is a Tape Table, a Task Table, a Camera Table, a lens table, an ingest table and a number of Take Annotation Tables.

The Ingest table contains an Ingest ID which is associated with the Ingest Id in the take table and a description.

The Tape Table comprises a number of fields including Tape ID, which is associated with the Tape ID field of the Take Table, PID, Format, Max Duration, First Usage, Max Erasures, Current Erasure, ETA (estimated time of arrival) and Last Erasure Date and a Picture Stamp.

The Task Table comprises a number of fields including Task ID, PID, Media ID, Shot ID, which are associated with the Media ID and Shot ID fields respectively of the Take Table, Title, Task Notes, Distribution List and CC List. Associated with the Task Table is a Planned Shot Table.

The Planned Shot Table comprises a number of fields including Planned Shot ID, PID, Media ID, Shot ID, which are associated with the PID, Media ID and Shot ID respectively of the Task Table, Director, Shot Title, Location, Notes, Description, Videographer, Due date, Programme title, media title Aspect Ratio and Format.

The Camera Table comprises a number of fields including Camera ID, which is associated with the Camera ID field of the Take Table, Manufacturer, Model, Format, Serial Number, Head Hours, Lens ID, Notes, Contact Name, Contact Address and Contact Phone Number and a Picture Stamp.

The Lens Table comprises a number of fields including Lens ID, which is associated with the Lens ID field of the Take Table, Manufacturer, Model, Serial Number, Contact Name, Contact Address and Contact Phone Number and a Picture Stamp.

Each Take Annotation Table comprises a number of fields including Take Annotation ID, Basic UMID, Timecode, Shutter Speed, Iris, Zoom, Gamma, Shot Marker ID, Filter Wheel, Detail and Gain. Associated with each Take Annotation Table is a Shot Marker Table.

The Shot Marker Table comprises a number of fields including Shot Marker ID, which is associated with the Shot Marker ID of the Take Annotation Table, and Description.

UMID Description

Figure 14:
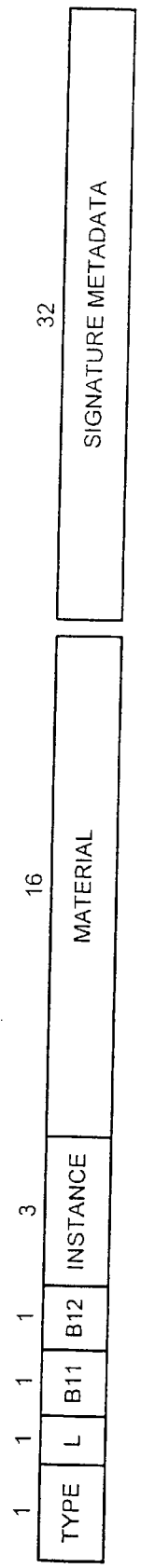
FIG. 14 is a schematic block diagram illustrating the structure of a data reduced UMID.
Figure 15:
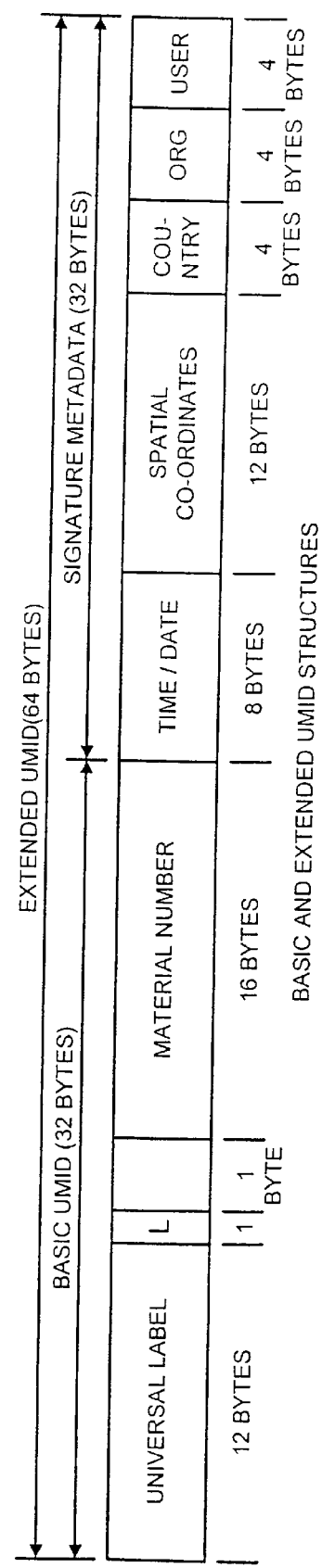
FIG. 15 is a schematic block diagram illustrating the structure of an extended UMID.

A UMID is described in SMPTE Journal March 2000 which provides details of the UMID standard. Referring to FIGS. 14 and 15, a basic and an extended UMID are shown. It comprises a first set of 32 bytes of basic UMID and a second set of 32 bytes of signature meta data.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature meta data as a set of packed meta used to create an extended UMID. The extended UMID comprises the followed immediately by signature meta data which comprises:

8-byte time/date code identifying the time and date of the Content Unit creation.

12-byte value which defines the spatial co-ordinates at the time of Content Unit creation.

3 groups of 4-byte codes which register the country, organisation and user codes.

Each component of the basic and extended UMIDs will now be defined in turn.

The 12-byte Universal Label

The first 12 bytes of the UMID provide identification of the UMID by the ring value defined in table 1.

TABLE 1

Specification of the UMID Universal Label

| Byte No. | Description | Value (hex) |
|---|---|---|
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Meta data Dictionaries | 01h |
| 7 | Standard: Dictionary Number | 01h |
| 8 | Version number | 01h |

TABLE 1-continued

Specification of the UMID Universal Label

| Byte No. | Description | Value (hex) |
|---|---|---|
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in table 1 may be changed: the values given are examples. Also the bytes 1–12 may have designations other than those shown by way of example in the table. Referring to the Table 1, in the example shown byte 4 indicates that bytes 5–12 relate to a data format agreed by SMPTE. Byte 5 indicates that bytes 6 to 10 relate to "dictionary" data. Byte 6 indicates that such data is "meta data" defined by bytes 7 to 10. Byte 7 indicates the part of the dictionary containing meta data defined by bytes 9 and 10. Byte 10 indicates the version of the dictionary. Byte 9 indicates the class of data and Byte 10 indicates a particular item in the class.

In the present embodiment bytes 1 to 10 have fixed pre-assigned values. Byte 11 is variable. Thus referring to FIG. 15, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature meta data of the extended UMID and/or other meta data.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated meta data. Without this instance number, all material could be linked to any instance of the material and its associated meta data.

The creation of a new clip requires the creation of a new Material number together with a zero Instance number. Therefore, a non-zero Instance number indicates that the associated clip is not the source material. An Instance number is primarily used to identify associated meta data related to any particular instance of a clip.

Material Number

The 16-byte Material number is a non-zero number created by one of several means identified in the standard. The number is dependent on a 6-byte registered port ID number, time and a random number generator.

Signature Meta data

Any component from the signature meta data may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the 17 Nov. 1858 and allows dates to the year 4597.

The Spatial Co-ordinate Format

The spatial co-ordinate value consists of three components defined as follows:

Altitude: 8 decimal numbers specifying up to 99,999,999 meters.
Longitude: 8 decimal numbers specifying East/West 180.00000 degrees (5 decimal places active).
Latitude: 8 decimal numbers specifying North/South 90.00000 degrees (5 decimal places active).

The Altitude value is expressed as a value in meters from the center of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Freelance Operators

Freelance operators may use their country of domicile for the country code and use the Organisation and User codes concatenated to e.g. an 8 byte code which can be registered with SMPTE. These freelance codes may start with the '~' symbol (ISO 8859 character number 7Eh) and followed by a registered 7 digit alphanumeric string.

As will be appreciated by those skilled in the art various modifications may be made to the embodiments herein before described without departing from the scope of the present invention. For example whilst embodiments have been described with recording audio/video onto magnetic tape, it will be appreciated that other recording media are possible.

Having regard to the description of example embodiments of the invention described above, it will be appreciated that a further aspect of the present invention provides a video processing apparatus and an audio processing apparatus for processing video signals representing images and audio signals representing sound, data video and audio processing apparatus comprising an activity detector which is arranged in operation to receive the video signals and the audio signals respectively and to generate an activity signal indicative of an amount of activity within the images represented by the video signal, and the sound within the audio signal respectively, and a meta data generator coupled to the activity detector which is arranged in operation to receive the video signal and the audio signal respectively and the activity signal and to generate meta data representative of the content of the video signals and audio signals at temporal positions within the video signal and audio signal respectively, which temporal positions are determined from data activity signal.

As will be appreciated those features of the invention which appear in the example embodiments as a data processor or processing units could be implemented in hardware as well as a software computer program running on an appropriate data processor. Correspondingly those aspects and features of the invention which are described as computer or application programs running on a data processor may be implemented as dedicated hardware. It will therefore be appreciated that a computer program running on a data processor which serves to form an audio and/or video generation apparatus as herein before described is an aspect of the present invention. Similarly a computer program recorded onto a recordable medium which serves to define the method according to the present invention or when loaded onto a computer forms an apparatus according to the present invention are aspects of the present invention.

Whilst the embodiments described above each include explicitly recited combinations of features according to different aspects of the present invention, other embodiments are envisaged according to the general teaching of the invention, which include combinations of features as appropriate, other than those explicitly recited in the embodiments described above. Accordingly, it will be appreciated that different combinations of features of the appended independent and dependent claims form further aspects of the invention other than those, which are explicitly recited in the claims.

What is claimed is:

1. An audio/video reproducing apparatus connectable to a communications network for selectively reproducing items of audio/video material from a recording medium, the reproducing apparatus comprising:
   a control processor which is arranged in use to receive data representing a request for a selected audio/video material item via a first network interface connectable to a first communications network, the data representing the request including metadata indicative of the selected audio/video material item; and
   a reproducing processor coupled to the control processor and arranged in response to signals identifying said selected audio/video material items from said control processor to reproduce said audio/video material item, the audio/video material item being communicated via a second network interface connectable to a second communications network for communicating said items of audio/video material, said second communications network having a higher bandwidth than said first communications network.

2. An audio/video reproducing apparatus as claimed in claim 1, wherein said first network interface is arranged to operate in accordance with a data communications network standard selected from the Ethernet, RS 322 and RS 422 standards.

3. An audio/video reproducing apparatus as claimed in claim 1, wherein said second network interface is arranged to operate in accordance with the Serial Digital Interface (SDI) or the Serial Digital Transport Interface (SDTI).

4. An audio/video reproducing apparatus as claimed in claim 1, wherein said metadata is at least one of UMID, tape ID and time codes, and a Unique Material Reference Number, identifying the material items.

5. An audio/video reproducing apparatus as claimed in claim 1, wherein said reproducing apparatus comprises a plurality of audio/video recording/reproducing apparatus each of which is coupled to said control processor via a local data bus.

6. An audio/video reproducing apparatus as claimed in claim 5, wherein said local bus includes a control communications channel for communicating control data to and/or from said control processor, and a video data communications channel for communicating said items of audio/video material from said plurality of audio/video recording/reproducing apparatus to said communications network.

7. An audio/video reproducing apparatus as claimed in claim 1, further comprising a display device which is arranged in operation to display images representative of said audio/video material items present on said recording medium.

8.n An audio/video reproducing apparatus as claimed in claim 7, wherein said display device is a touch screen coupled to said control processor, and arrange in use to receive touch commands from a user for selecting said items of audio/video material.

9. An audio/video reproducing apparatus as claimed in claim 1, wherein said control processor is arranged to generate data representing a material identifier for each of said audio/video material items, from data recorded with said audio/video material items on said recording medium.

10. An audio/video reproducing apparatus as claimed in claim 9, wherein said material identifier is a UMID.

11. A computer program providing computer executable instructions, which when loaded onto a data processor configures the data processor to operate as an audio/video reproducing apparatus according to claim 1.

12. A computer program product having a computer readable medium recorded thereon information signals representative of the computer program claimed in claim 11.

13. A signal representing audio and/or video material produced by an audio/video reproducing apparatus according to claim 1.

14. A data carrier on which is recorded data representing audio and/or video material produced by an audio/video reproducing apparatus according to claim 1.

15. A method of reproducing items of audio/video material from a recording medium, comprising the steps of:
   communicating metadata identifying a selected item of audio/video material via a first communications network;
   receiving said identifying metadata at an audio/video reproducing apparatus in which said recording medium is loaded;
   selectively reproducing said selected item of audio/video material from said recording medium in accordance with said identifying metadata; and
   communicating said selected item of audio/video material via a second communications network in response to said identifying metadata, said second communications network having a higher bandwidth than said first communications network.

16. A computer program providing computer executable instructions, which when loaded on to a data processor causes the data processor to perform the method according to claim 15.

17. A video processing apparatus for processing video signals representing images, said apparatus comprising:
- an activity detector which is arranged in operation to receive said video signals and to generate an activity signal indicative of an amount of activity within the images represented by the video signal; and
- an image generator coupled to the activity detector which is arranged in operation to receive said video signal and said activity signal and to generate sample images at temporal positions within said video signal, which temporal positions are determined from said activity signal, wherein said activity signal is representative of a relative amount of activity within the images represented by said video signal and said image detector is arranged in operation to produce more of said sample images during periods of greater activity indicated by said activity signal.

18. A video processing apparatus as claimed in claim 17, wherein said sample images are represented by a substantially reduced amount of data in comparison to said images represented by said video signal.

19. A video processing apparatus as claimed in claim 17, comprising
- a reproduction processor which is arranged in operation to receive a recording medium on which said video signals are recorded and to reproduce said video signals from said recording medium.

20. A video processing apparatus as claimed in claim 19, wherein said image generator is arranged in operation to generate, for each of said sample images a material identification representative of a location on said recording medium where the video signal corresponding to said sample images are recorded.

21. A video processing apparatus as claimed in claim 17, comprising a display device for displaying said sample images.

22. A video processing apparatus as claimed in claim 17, wherein said display device is arranged to display said sample images at locations on said display device which are representative of the location on said recording medium at which said sample images are recorded.

23. A video processing apparatus as claimed in claim 17, wherein said activity detector generates said activity signal by forming a histogram of colour components of said video image and determining a rate of change of said colour components.

24. A video processing apparatus as claimed in claim 17, wherein said activity detector generates said activity signal from motion vectors of image components of said video image signal.

25. An editing system having a database connected to a communications channel and a video processor as claimed in claim 17, wherein the video processor includes a communications device for communicating the sample images to said database via the communications channel, said sample images being stored in said data base.

26. An audio/video processing apparatus for processing video signals which include associated audio signals representative of sound including speech, said apparatus comprising:
- a speech analysis processor which is arranged in operation to generate data identifying speech detected within said audio signals;
- an activity processor coupled to said speech analysis processor and arranged in operation to generate an activity signal in accordance with the data identifying speech present in said audio signal;
- a video processing apparatus operable to generate sample images from a video signal in response to said activity signal; and
- a content information generator coupled to said activity processor, said speech analysis processor and said video processing apparatus and arranged in operation to generate data representing the content of said speech at temporal positions within said audio signal determined by said activity signal, wherein sample images are generated at the temporal positions indicated by said activity signal with said speech content data.

27. An audio/video processing apparatus as claimed in claim 26, wherein said activity signal is indicative of the start of a speech sentence, said speech content data representing text data being generated at the start of the sentence.

28. An audio/video processing apparatus as claimed in claim 26, wherein said activity signal is indicative of a first time a person included in the content of said video signal speaks, said speech content data representing text data generated for the first speech of the person.

29. An audio/video processing apparatus as claimed in claim 26, comprising a reproduction processor which is arranged in operation to receive a recording medium on which said video and said associated audio signals are recorded and to reproduce said audio signals from said recording medium.

30. An audio/video processing apparatus as claimed in claim 29, wherein said content information generator is arranged in operation to generate, for each of said sample images a material identification representative of a location on said recording medium where the audio signals corresponding to said speech content data are recorded.

31. An audio/video processing apparatus as claimed in claim 30, wherein said speech content data is representative of text corresponding to the content of the speech.

32. An audio/video processing apparatus as claimed in claim 31, comprising a display device for displaying said text.

33. An audio/video processing apparatus as claimed in claim 32, wherein said display device is arranged to display said text with respect to a location on said display device which is representative of a location on said recording medium at which said text is recorded.

34. An audio/video processing apparatus as claimed in claim 26, comprising a communications processor which is arranged in operation to communicate said speech content data.

35. An editing system having a database connected to a communications channel and an audio/video processor as claimed in claim 26, wherein the audio/video processor includes a communications device for communicating the sample images and said speech content data to said database via the communications channel, said sample images being stored in said data base with the speech data.

36. An audio/video processing apparatus as claimed in claim 26, wherein the video processing apparatus comprises:
- an image activity detector which is arranged in operation to receive said video signals and to generate an image activity signal indicative of an amount of activity within the images represented by the video signal; and
- an image generator coupled to the image activity detector which is arranged in operation to receive said video signal and said image activity signal and to generate sample images at temporal positions within said video signal, which temporal positions are determined from said image activity signal, wherein said image activity signal is representative of a relative amount of activity within the images represented by said video signal and said image detector is arranged in operation to produce more of said sample images during periods of greater activity indicated by said activity signal.

37. A method of processing video signals, comprising the steps of:
   receiving video signals;
   generating an activity signal indicative of an amount of activity within the images represented by the video signal;
   generating sample images at temporal positions within said video signal, which temporal positions are determined from said activity signal, wherein said activity signal is representative of a relative amount of activity within the images represented by said video signal, and said generating the sample images comprises:
   producing more of said sample images during periods of greater activity indicated by said activity signal.

38. A method of processing video signals which include associated audio signals representative of sound including speech, said method comprising the steps of generating speech data identifying speech detected within said audio signals, generating an activity signal in response to said speech data, and generating sample images from a video signal in response to said activity signal, wherein said generating said speech data comprises generating data representing the content of said speech at temporal positions within said audio signal determined by said activity signal, wherein sample images are generated at the temporal positions indicated by said activity signal with said speech data.

39. A system for editing audio/video productions, comprising:
   an ingestion processor having means for receiving a recording medium and being arranged in use to reproduce selectively audio/video material items from said recording medium in response to meta data identifying the selected audio/video material items;
   a database operable to receive and to store content meta data describing the contents of said audio/video material items on said recording medium in association with meta data identifying the audio/video material items; and
   an editing processor coupled to said ingestion processor and said database, said editing processor having a graphical user interface for displaying a representation of said content meta data stored in said data base and for selecting said audio/video material items from said displayed representation of said content meta data, said editing processor being arranged to combine user selected items of audio/video material, which are selectively reproduced by said ingestion processor in response to the identifying meta data corresponding to said selected items of audio/video material being communicated to said ingestion processor by said editing processor.

40. A system as claimed in claim 39, wherein said editing processor is coupled to said database and said audio/video reproducing apparatus via a data communications network.

41. A system as claimed in claim 40, wherein said data communications network comprises:
   a first communications channel coupled to said editing station, said database and said ingestion processor for communicating said identifying metadata; and
   a second communications channel coupled to said editing station, said database and said ingestion processor for communicating said items of audio/video material.

42. A system as claimed in claim 41, wherein said first network interface is arranged to operate in accordance with a data communications network standard selected from the Ethernet, RS 322 and RS 422 standards.

43. A system as claimed in claim 41, wherein said second network interface is arranged to operate in accordance with the Serial Digital Interface (SDI) or the Serial Digital Transport Interface (SDTI).

44. A system as claimed in claim 39, wherein said identifying meta data includes at least one of UMID, tape ID and time codes, and a Unique Material Reference Number, identifying the material items.

45. A system as claimed in claim 39, wherein said content meta data includes sample images representing the content of the audio/video material items at sample temporal positions within said audio/video material items.

46. A system as claimed in claim 39, wherein said recording medium includes said content metadata describing the content of the audio/video material items recorded on to said recording medium, and said ingestion processor is arranged in operation to reproduce said content meta data and to communicate said content meta data via said network to said database, said database operating to receive and to store said content metadata.

47. A method of generating an audio/video production by selecting and combining items of content meta data, said method comprising the steps of:
   loading a recording medium on which items of audio/video material are recorded into an ingestion processor;
   reviewing content meta data describing the content of the audio/video material items on said recording medium; and
   consequent upon said review, selecting content meta data corresponding to a desired selection of audio/video material items,
   selectively retrieving items of audio/video material from said recording medium to form said audio/video production, in accordance with meta data identifying the selected audio/video material items associated with the content meta data.

48. A method as claimed in claim 47, further comprising the step of loading content metadata describing the content of the audio/video material items into a database; wherein the step of reviewing the metadata comprises the step of interrogating said database.

49. A method as claimed in claim 48, wherein said content metadata and said identifying metadata are present on said recording medium with said items of audio/video material, and said method comprises the steps of:
   ingesting said content meta data and said identifying metadata using said ingestion processor;
   communicating said content meta data and said identifying meta data to said database; and
   storing said content meta data in association with said identifying meta data in said database.

* * * * *